(12) United States Patent
Venugopal et al.

(10) Patent No.: US 12,127,028 B2
(45) Date of Patent: Oct. 22, 2024

(54) RESOURCE SET CONFIGURATION REPORTING WITH MULTIPLE CHANNEL AND INTERFERENCE MEASUREMENTS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

( * ) Notice: Subject to any disclaimer, the term of this patent is extended or adjusted under 35 U.S.C. 154(b) by 154 days.

(21) Appl. No.: 17/468,396

(22) Filed: Sep. 7, 2021

(65) Prior Publication Data

US 2022/0078656 A1   Mar. 10, 2022

Related U.S. Application Data

(60) Provisional application No. 63/076,287, filed on Sep. 9, 2020.

(51) Int. Cl.
| | |
|---|---|
| *H04W 24/10* | (2009.01) |
| *H04B 17/309* | (2015.01) |
| *H04W 72/08* | (2009.01) |
| *H04W 72/542* | (2023.01) |
| *H04W 72/20* | (2023.01) |

(52) U.S. Cl.
CPC .......... *H04W 24/10* (2013.01); *H04B 17/309* (2015.01); *H04W 72/542* (2023.01); *H04W 72/20* (2023.01)

(58) Field of Classification Search
CPC ... H04W 24/10; H04W 72/542; H04W 72/20; H04B 17/309

USPC ........................................................ 370/252
See application file for complete search history.

(56) References Cited

U.S. PATENT DOCUMENTS 9,609,537 B2 * 3/2017 Geirhofer ............. H04W 24/10

FOREIGN PATENT DOCUMENTS

| EP | 3618491 A1 | 3/2020 |
| WO | WO-2020034312 A1 | 2/2020 |

OTHER PUBLICATIONS

International Search Report and Written Opinion—PCT/US2021/049369—ISA/EPO—Mar. 9, 2022 (208017WO).

(Continued)

*Primary Examiner* — Melvin C Marcelo

(57) ABSTRACT

Methods, systems, and devices for wireless communications are described. A user equipment (UE) may receive a reporting configuration that may include a number of channel measurement or interference measurement resource sets that the UE may measure in accordance with one or more reporting quantities. Based on receiving multiple resource sets in a reporting configuration from the base station, the UE may generate and transmit a measurement report including resource sets contained in the reporting configuration. This may allow the UE to report different report quantities between different resource sets indicated by a base station. In addition, the UE may be configured to rank measurements using different reporting quantities. The report configuration may configure the UE to perform measurements of different resources in accordance with one or more reporting quantities, and the UE may apply a rule to rank different measurements based on the indicated reporting quantities.

30 Claims, 19 Drawing Sheets

(56) References Cited

OTHER PUBLICATIONS

CATT: "General CSI Framework for CSI Acquisition and Beam Management", 3GPP Draft, R1-1717814, 3GPP TSG RAN WG1 Meeting 90bis, vol. RAN WG1, No. Prague, CZ, Oct. 9, 2017-Oct. 13, 2017, Oct. 8, 2017 (Oct. 8, 2017), XP051340999, 6 Pages, Retrieved from the Internet: URL:http://www.3gpp.org/ftp/Meetings_3GPP_SYNC/RAN1/Docs/ [retrieved on Oct. 8, 2017] Sections 1-3.

Huawei, et al., "Remaining Issues for CSI Framework", 3GPP Draft, R1-1800529, 3GPP TSG RAN WG1 Ad Hoc Meeting, vol. RAN WG1, No. Vancouver, Canada, Jan. 22, 2018-Jan. 26, 2018, Jan. 13, 2018 (Jan. 13, 2018), XP051384907, 6 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] Sections 1-3.

Huawei, et al., "Summary of Remaining Issues for CSI Reporting", 3GPP TSG RAN WG1 Ad Hoc Meeting, 3GPP Draft, R1-1800095, vol. RAN WG1, No. Vancouver, Canada, Jan 22, 2018-Jan 26, 2018, Jan. 13, 2018 (Jan. 13, 2018), XP051384591, 8 pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] Sections 1-4, the whole document.

Partial International Search Report—PCT/US2021/049369—ISA/EPO—Jan 19, 2022 (208017WO).

\* cited by examiner

RESOURCE SET CONFIGURATION REPORTING WITH MULTIPLE CHANNEL AND INTERFERENCE MEASUREMENTS

CROSS REFERENCE

The present Application for Patent claims the benefit of U.S. Provisional Patent Application No. 63/076,287 by VENUGOPAL et al., entitled "RESOURCE SET CONFIGURATION REPORTING WITH MULTIPLE CHANNEL AND INTERFERENCE MEASUREMENTS," filed Sep. 9, 2020, assigned to the assignee hereof, and expressly incorporated by reference herein.

FIELD OF TECHNOLOGY

The following relates to wireless communications, including resource set configuration reporting with multiple channel and interference measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may implement various beam management techniques. In such techniques, a base station may configure a UE to report one or more beam or beam-related resource measurements. Conventional reporting techniques for the one or more measurements, however, may be deficient.

SUMMARY

The described techniques relate to improved methods, systems, devices, and apparatuses that support resource set configuration reporting with multiple channel and interference measurements. To establish or maintain communications quality in a wireless communications network, a base station and a user equipment (UE) may be configured to perform a number of beam management procedures to select a best beam or channel for communication (e.g., a beam or channel having the highest measured signal strength or quality). The UE may receive a reporting configuration from the base station that may include a number of channel measurement resource (CMR) sets, interference measurement resource (IMR) sets, or both, that the UE may measure in accordance with one or more reporting quantities. For example, the UE may be configured to measure the CMR sets, the IMR sets, or both, based on a received power associated with the resources (e.g., reference signal receive power (RSRP)), or a signal quality metric (e.g., more signal to interference plus noise ratio (SINR)). Based on receiving multiple resource sets in a reporting configuration from the base station, the UE may generate and transmit a measurement report for resource sets contained in the reporting configuration. For example, the UE may transmit RSRP or SINR measurements associated with resources of each resource set, which may allow the UE to report different report quantities for each of multiple resource sets (e.g., a RSRP report for each CMR set of multiple configured CMR sets) indicated by the base station.

To further facilitate the selection of the best quality beams, the UE may be configured to rank measurements using different reporting quantities. For example, the UE may receive a report configuration that configures the UE to perform measurements of different resources in accordance with one or more reporting quantities, and the UE may apply a rule to rank different measurements based on the indicated reporting quantities. The UE may perform measurements according to the rule, which may include prioritization of one reporting quantity over another, by using a scaling factor to normalize measurements, or by use of dynamic priority signaling.

A method of wireless communication at a UE is described. The method may include receiving, from a base station, a reporting configuration message that configures the UE to generate a measurement report that indicates a first resource set including a first set of resources and a second resource set including a second set of resources that are different from the first set of resources, performing a first set of measurements of the first set of resources of the first resource set and a second set of measurements of the second set of resources of the second resource set, and transmitting at least one measurement report indicating a first measurement of the first set of measurements corresponding to a first resource of the first set of resources of the first resource set, and a second measurement of the second set of measurements corresponding to a second resource of the second set of resources of the second resource set.

An apparatus for wireless communication at a UE is described. The apparatus may include a processor, memory coupled with the processor, and instructions stored in the memory. The instructions may be executable by the processor to cause the apparatus to receive, from a base station, a reporting configuration message that configures the UE to generate a measurement report that indicates a first resource set including a first set of resources and a second resource set including a second set of resources that are different from the first set of resources, perform a first set of measurements of the first set of resources of the first resource set and a second set of measurements of the second set of resources of the second resource set, and transmit at least one measurement report indicating a first measurement of the first set of measurements corresponding to a first resource of the first set of resources of the first resource set, and a second measurement of the second set of measurements corresponding to a second resource of the second set of resources of the second resource set.

Another apparatus for wireless communication at a UE is described. The apparatus may include means for receiving, from a base station, a reporting configuration message that configures the UE to generate a measurement report that indicates a first resource set including a first set of resources and a second resource set including a second set of resources that are different from the first set of resources, performing a first set of measurements of the first set of resources of the first resource set and a second set of measurements of the second set of resources of the second resource set, and transmitting at least one measurement report indicating a first measurement of the first set of measurements corresponding to a first resource of the first set of resources of the first resource set, and a second measurement of the second set of measurements corresponding to a second resource of the second set of resources of the second resource set.

A non-transitory computer-readable medium storing code for wireless communication at a UE is described. The code may include instructions executable by a processor to receive, from a base station, a reporting configuration message that configures the UE to generate a measurement report that indicates a first resource set including a first set of resources and a second resource set including a second set of resources that are different from the first set of resources, perform a first set of measurements of the first set of resources of the first resource set and a second set of measurements of the second set of resources of the second resource set, and transmit at least one measurement report indicating a first measurement of the first set of measurements corresponding to a first resource of the first set of resources of the first resource set, and a second measurement of the second set of measurements corresponding to a second resource of the second set of resources of the second resource set.

In some examples of the method, apparatuses, and non-transitory computer-readable medium described herein, transmitting the at least one measurement report may include operations, features, means, or instructions for transmitting a first measurement report indicating the first measurement, and transmitting a second measurement report indicating the second measurement, where the second measurement report may be transmitted separate from the first measurement report based on the reporting configuration message.

In some examples of the method, apparatuses, and non-transitory computer-readable medium described herein, receiving the reporting configuration message may include operations, features, means, or instructions for receiving the reporting configuration message that indicates a first set of resource sets and a second set of resource sets, and a respective mapping between each resource set of the first set of resource sets and each resource set of the second set of resource sets.

In some examples of the method, apparatuses, and non-transitory computer-readable medium described herein, the first set of resource sets include a set of channel measurement resource sets and the second set of resource sets includes a set of interference measurement resource sets.

In some examples of the method, apparatuses, and non-transitory computer-readable medium described herein, receiving the reporting configuration message further may include operations, features, means, or instructions for receiving the reporting configuration message that indicates a request for group beam reporting, and transmitting the at least one measurement report indicating the first measurement corresponding to the first resource and the second measurement corresponding to the second resource based on the request for group beam reporting.

In some examples of the method, apparatuses, and non-transitory computer-readable medium described herein, each measurement of the first set of measurements corresponds to a respective resource of the first resource set.

In some examples of the method, apparatuses, and non-transitory computer-readable medium described herein, each measurement of the second set of measurements corresponds to a respective resource from the second resource set.

In some examples of the method, apparatuses, and non-transitory computer-readable medium described herein, the first resource set may be a first channel measurement resource set and the second resource set may be a second channel measurement resource set, or the first resource set may be a first interference measurement resource set and the second resource set may be a second interference measurement resource set.

In some examples of the method, apparatuses, and non-transitory computer-readable medium described herein, the measurement report indicates a first resource identifier of the first resource, a second resource identifier of the second resource, or both.

In some examples of the method, apparatuses, and non-transitory computer-readable medium described herein, the first set of measurements and the second set of measurements include one or more SINR measurements, RSRP measurements, or both.

A method of wireless communication at a UE is described. The method may include receiving, from a base station, a reporting configuration message that configures the UE to measure a set of resources using a first reporting quantity type and a second reporting quantity type, identifying a rule for ranking a measurement of the first reporting quantity type relative to a measurement of the second reporting quantity type, performing a first set of measurements of at least a first subset of the set of resources in accordance with the first reporting quantity type and a second set of measurements of at least a second subset of the set of resources in accordance with the second reporting quantity type, and transmitting a measurement report indicating a subset of the set of resources selected based on the rule.

An apparatus for wireless communication at a UE is described. The apparatus may include a processor, memory coupled with the processor, and instructions stored in the memory. The instructions may be executable by the processor to cause the apparatus to receive, from a base station, a reporting configuration message that configures the UE to measure a set of resources using a first reporting quantity type and a second reporting quantity type, identify a rule for ranking a measurement of the first reporting quantity type relative to a measurement of the second reporting quantity type, perform a first set of measurements of at least a first subset of the set of resources in accordance with the first reporting quantity type and a second set of measurements of at least a second subset of the set of resources in accordance with the second reporting quantity type, and transmit a measurement report indicating a subset of the set of resources selected based on the rule.

Another apparatus for wireless communication at a UE is described. The apparatus may include means for receiving, from a base station, a reporting configuration message that configures the UE to measure a set of resources using a first reporting quantity type and a second reporting quantity type, identifying a rule for ranking a measurement of the first reporting quantity type relative to a measurement of the second reporting quantity type, performing a first set of measurements of at least a first subset of the set of resources in accordance with the first reporting quantity type and a second set of measurements of at least a second subset of the set of resources in accordance with the second reporting quantity type, and transmitting a measurement report indicating a subset of the set of resources selected based on the rule.

A non-transitory computer-readable medium storing code for wireless communication at a UE is described. The code may include instructions executable by a processor to receive, from a base station, a reporting configuration message that configures the UE to measure a set of resources using a first reporting quantity type and a second reporting quantity type, identify a rule for ranking a measurement of the first reporting quantity type relative to a measurement of the second reporting quantity type, perform a first set of measurements of at least a first subset of the set of resources in accordance with the first reporting quantity type and a second set of measurements of at least a second subset of the set of resources in accordance with the second reporting quantity type, and transmit a measurement report indicating a subset of the set of resources selected based on the rule.

In some examples of the method, apparatuses, and non-transitory computer-readable medium described herein, identifying the rule further may include operations, features, means, or instructions for receiving, from the base station, control signaling that includes an indication of the rule.

In some examples of the method, apparatuses, and non-transitory computer-readable medium described herein, the control signaling includes a radio resource control (RRC) message, a medium access control (MAC) control element (CE), downlink control information (DCI), or any combination thereof.

In some examples of the method, apparatuses, and non-transitory computer-readable medium described herein, identifying the rule may include operations, features, means, or instructions for receiving control signaling that indicates the rule that may be a scaling factor to apply to one or more measurements of the first reporting quantity type, or to one or more measurements of the second reporting quantity type, or both, where the measurement report indicates the subset of the set of resources selected based on the scaling factor.

In some examples of the method, apparatuses, and non-transitory computer-readable medium described herein, the first reporting quantity type may be an RSRP measurement, and the second reporting quantity type may be an SINR measurement.

In some examples of the method, apparatuses, and non-transitory computer-readable medium described herein, receiving the reporting configuration message may include operations, features, means, or instructions for receiving the reporting configuration message where an order in which the first reporting quantity type and the second reporting quantity type occur within the reporting configuration message indicates the rule.

In some examples of the method, apparatuses, and non-transitory computer-readable medium described herein, identifying the rule further may include operations, features, means, or instructions for retrieving the rule from a memory of the UE.

A method of wireless communication at a base station is described. The method may include transmitting a reporting configuration message that configures a UE to generate a measurement report that indicates a first resource set including a first set of resources and a second resource set including a second set of resources that are different from the first set of resources and receiving the measurement report indicating a first measurement corresponding to a first resource of the first set of resources of the first resource set, and a second measurement corresponding to a second resource of the second set of resources of the second resource set.

An apparatus for wireless communication at a base station is described. The apparatus may include a processor, memory coupled with the processor, and instructions stored in the memory. The instructions may be executable by the processor to cause the apparatus to transmit a reporting configuration message that configures a UE to generate a measurement report that indicates a first resource set including a first set of resources and a second resource set including a second set of resources that are different from the first set of resources and receive the measurement report indicating a first measurement corresponding to a first resource of the first set of resources of the first resource set, and a second measurement corresponding to a second resource of the second set of resources of the second resource set.

Another apparatus for wireless communication at a base station is described. The apparatus may include means for transmitting a reporting configuration message that configures a UE to generate a measurement report that indicates a first resource set including a first set of resources and a second resource set including a second set of resources that are different from the first set of resources and receiving the measurement report indicating a first measurement corresponding to a first resource of the first set of resources of the first resource set, and a second measurement corresponding to a second resource of the second set of resources of the second resource set.

A non-transitory computer-readable medium storing code for wireless communication at a base station is described. The code may include instructions executable by a processor to transmit a reporting configuration message that configures a UE to generate a measurement report that indicates a first resource set including a first set of resources and a second resource set including a second set of resources that are different from the first set of resources and receive the measurement report indicating a first measurement corresponding to a first resource of the first set of resources of the first resource set, and a second measurement corresponding to a second resource of the second set of resources of the second resource set.

In some examples of the method, apparatuses, and non-transitory computer-readable medium described herein, receiving the measurement report may include operations, features, means, or instructions for receiving a first measurement report indicating the first measurement, and receiving a second measurement report indicating the second measurement, where the second measurement report may be transmitted separate from the first measurement report based on the reporting configuration message.

In some examples of the method, apparatuses, and non-transitory computer-readable medium described herein, transmitting the reporting configuration message may include operations, features, means, or instructions for transmitting the reporting configuration message that indicates a first set of resource sets and a second set of resources sets, and a respective mapping between each resource set of the first set of resource sets and each resource set of the second set of resource sets.

In some examples of the method, apparatuses, and non-transitory computer-readable medium described herein, the first set of resource sets include a set of channel measurement resource sets and the second set of resource sets include a set of interference measurement resource sets.

In some examples of the method, apparatuses, and non-transitory computer-readable medium described herein, transmitting the reporting configuration message further may include operations, features, means, or instructions for transmitting the reporting configuration message that indicates a request for group beam reporting at the UE, and receiving the measurement report indicating the first measurement corresponding to the first resource and the second measurement corresponding to the second resource based on the request for group beam reporting.

In some examples of the method, apparatuses, and non-transitory computer-readable medium described herein, each measurement of a first set of measurements corresponds to a respective resource of the first resource set.

In some examples of the method, apparatuses, and non-transitory computer-readable medium described herein, each measurement of a second set of measurements corresponds to a respective resource from the second resource set.

In some examples of the method, apparatuses, and non-transitory computer-readable medium described herein, the first resource set may be a first channel measurement resource set and the second resource set may be a second channel measurement resource set, or the first resource set may be a first interference measurement resource set and the second resource set may be a second interference measurement resource set.

In some examples of the method, apparatuses, and non-transitory computer-readable medium described herein, the measurement report indicates a first resource identifier of the first resource, a second resource identifier of the second resource, or both.

In some examples of the method, apparatuses, and non-transitory computer-readable medium described herein, the first measurement and the second measurement include one or more of an SINR measurement or an RSRP measurement.

A method of wireless communication at a base station is described. The method may include transmitting a reporting configuration message that configures a UE to measure a set of resources using a first reporting quantity type and a second reporting quantity type and receiving a measurement report indicating a subset of the set of resources selected based on a rule for ranking a measurement of the first reporting quantity type relative to a measurement of the second reporting quantity type.

An apparatus for wireless communication at a base station is described. The apparatus may include a processor, memory coupled with the processor, and instructions stored in the memory. The instructions may be executable by the processor to cause the apparatus to transmit a reporting configuration message that configures a UE to measure a set of resources using a first reporting quantity type and a second reporting quantity type and receive a measurement report indicating a subset of the set of resources selected based on a rule for ranking a measurement of the first reporting quantity type relative to a measurement of the second reporting quantity type.

Another apparatus for wireless communication at a base station is described. The apparatus may include means for transmitting a reporting configuration message that configures a UE to measure a set of resources using a first reporting quantity type and a second reporting quantity type and receiving a measurement report indicating a subset of the set of resources selected based on a rule for ranking a measurement of the first reporting quantity type relative to a measurement of the second reporting quantity type.

A non-transitory computer-readable medium storing code for wireless communication at a base station is described. The code may include instructions executable by a processor to transmit a reporting configuration message that configures a UE to measure a set of resources using a first reporting quantity type and a second reporting quantity type and receive a measurement report indicating a subset of the set of resources selected based on a rule for ranking a measurement of the first reporting quantity type relative to a measurement of the second reporting quantity type.

Some examples of the method, apparatuses, and non-transitory computer-readable medium described herein may further include operations, features, means, or instructions for transmitting, to the UE, control signaling that includes an indication of the rule.

In some examples of the method, apparatuses, and non-transitory computer-readable medium described herein, the control signaling includes a RRC message, a MAC-CE, DCI, or any combination thereof.

Some examples of the method, apparatuses, and non-transitory computer-readable medium described herein may further include operations, features, means, or instructions for transmitting control signaling that indicates the rule that may be a scaling factor to apply to one or more measurements of the first reporting quantity type, or to one or more measurements of the second reporting quantity type, or both, where the measurement report indicates the subset of the set of resources selected based on the scaling factor.

In some examples of the method, apparatuses, and non-transitory computer-readable medium described herein, the first reporting quantity type may be an RSRP measurement, and the first reporting quantity type may be an SINR measurement.

In some examples of the method, apparatuses, and non-transitory computer-readable medium described herein, transmitting the reporting configuration message may include operations, features, means, or instructions for transmitting the reporting configuration message where an order in which the first reporting quantity type and the second reporting quantity type occur within the reporting configuration message indicates the rule.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.).

While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
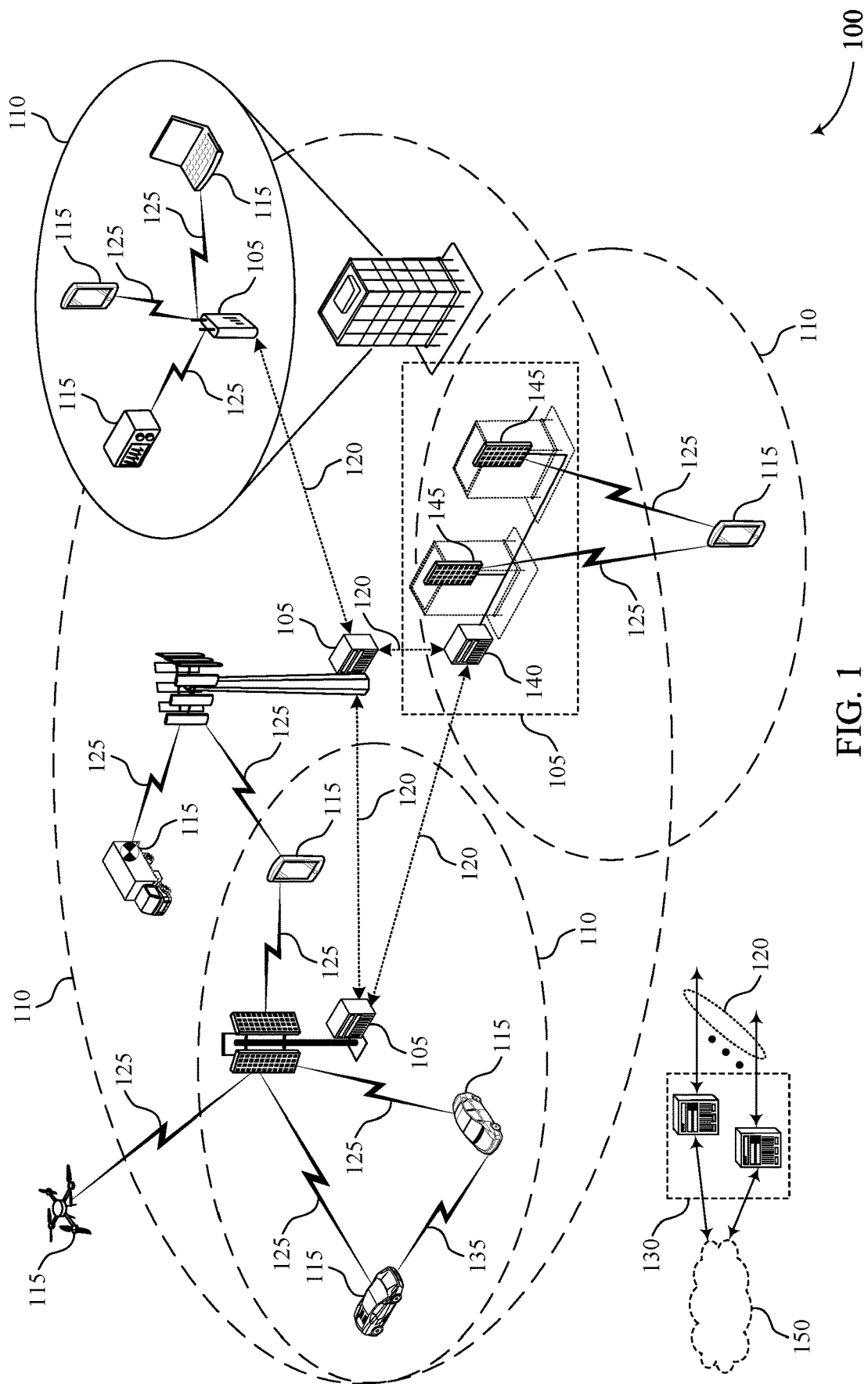
FIG. 1 illustrates an example of a wireless communications system that supports resource set configuration reporting with multiple channel and interference measurements in accordance with aspects of the present disclosure.

In some wireless communications systems, a base station and a user equipment (UE) may be configured to perform a number of beam management procedures to facilitate selection (or maintenance) of an appropriate beam or channel. In such cases, the UE may receive one or more report configuration signals (e.g., channel state information reference signals (CSI-RSs), synchronization signal blocks (SSB)) from the base station over one or more resources (e.g., time resources, frequency resources, beams). In some cases, the reporting configuration may indicate a number of channel measurement resource (CMR) sets, interference measurement resource (IMR) sets, or both, that the UE may measure in accordance with one or more reporting quantities. For example, the UE may be configured to measure the CMR or IMR sets based on a received power of the signal (e.g., reference signal receive power (RSRP)), or a signal quality metric (e.g., signal-to-noise-plus-interference ratio (SINR)).

Based on receiving multiple resource sets in a reporting configuration from the base station, the UE may generate and transmit a measurement report contained in the reporting configuration. For example, the UE may transmit RSRP or SINR measurements associated with resources of each resource set, allowing the UE to report different report quantities for each of multiple resource sets (e.g., a RSRP report for each CMR set of multiple configured CMR sets) indicated by the base station.

Based on receiving different reports per configured resource set of the reporting configuration, the base station may use the measurements to select a beam or a channel to use for communication with the UE. For example, each resource set transmitted by the base station may correspond to a number of beams or resources available for use by the UE, and the measurement report may indicate to the base station a beam or set of resources that is associated with a high communications quality (e.g., a highest measured RSRP or SINR).

In addition, the UE and base station may be configured to support group-based beam reporting based on the transmission of multiple resource sets within a report configuration. For example, receiving a report configuration that has multiple resource sets may implicitly indicate to the UE that the base station is able to simultaneously transmit using multiple transmission beams associated with the different resource sets. After the UE reports the best measurements back to the base station (e.g., one report per resource set), the base station may use the indicated resources for simultaneous transmissions to the UE using different transmission beams.

To further facilitate the selection of the best quality beams, the UE may be configured to rank measurements that it performs for the one or more resource sets per reporting configuration using different reporting quantities. For example, the UE may apply a rule to measurements such as allowing for the prioritization of one reporting quantity over another, by using a scaling factor to normalize measurements (e.g., scaling SINR relative to RSRP measurements to enable comparison between these two different measurements), or by use of dynamic priority signaling.

Particular aspects of the subject matter described herein may be implemented to realize one or more advantages. The described techniques may support improvements in beam management procedures by decreasing signaling overhead and decreasing latency in signaling between the base station and UE. As such, supported techniques may include improved network operations and, in some examples, may promote increased communications efficiency, among other benefits.

Aspects of the disclosure are initially described in the context of wireless communications systems. For example, aspects of the disclosure may be described in the context of beam management procedures between a base station and UE. Aspects of the disclosure are further illustrated by and described with reference to apparatus diagrams, system diagrams, process flows, and flowcharts that relate to resource set configuration reporting with multiple channel and interference measurements.

FIG. 1 illustrates an example of a wireless communications system 100 that supports resource set configuration reporting with multiple channel and interference measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a base station 105 and a UE 115 may be configured to perform a number of beam management procedures to select a best beam or channel for communication. In such cases, the UE 115 may receive one or more report configuration signals (e.g., CSI-RSs, SSBs, etc.) from the base station 105 over one or more resources (e.g., time resources, frequency resources, beams). In some cases, the reporting configuration may indicate a number of CMR sets, IMR sets, or both, that the UE may measure in accordance with one or more reporting quantities. For example, the UE may be configured to measure the CMR sets, the IMR sets, or both, based on a received power of the signal (e.g., RSRP), or a quality metric (e.g., SINR). Based on receiving multiple resource sets in a reporting configuration from the base station, the UE 115 may generate and transmit a single measurement report contained in the reporting configuration. For example, the UE 115 may transmit RSRP or SINR measurements associated with of the signals contained in a single resource set, allowing the UE 115 to report different report quantities for each of multiple resource sets (e.g., a RSRP report for each CMR set of multiple configured CMR sets) indicated by the base station 105.

In some cases, receiving a report configuration that has multiple resource sets may implicitly indicate support for group based beam reporting, and that the base station 105 is able to simultaneously transmit using multiple transmission beams associated with the different resource sets. After the UE 115 reports back the best measurements (e.g., one report per resource set), the base station 105 may use the indicated resources (e.g., a first beam corresponding to a first resource of a first resource set, and a second beam corresponding to a second resource of a second resource set) for simultaneous transmissions to the UE using different transmission beams.

To further facilitate the selection of the best quality beams, the UE 115 may be configured to rank measurements using different reporting quantities (e.g., rank an SINR measurement relative to a RSRP measurement). For example, the UE 115 may apply a rule to measurements such as allowing for the prioritization of one reporting quantity over another, by using a scaling factor to normalize measurements, or by use of dynamic priority signaling.

Figure 2:
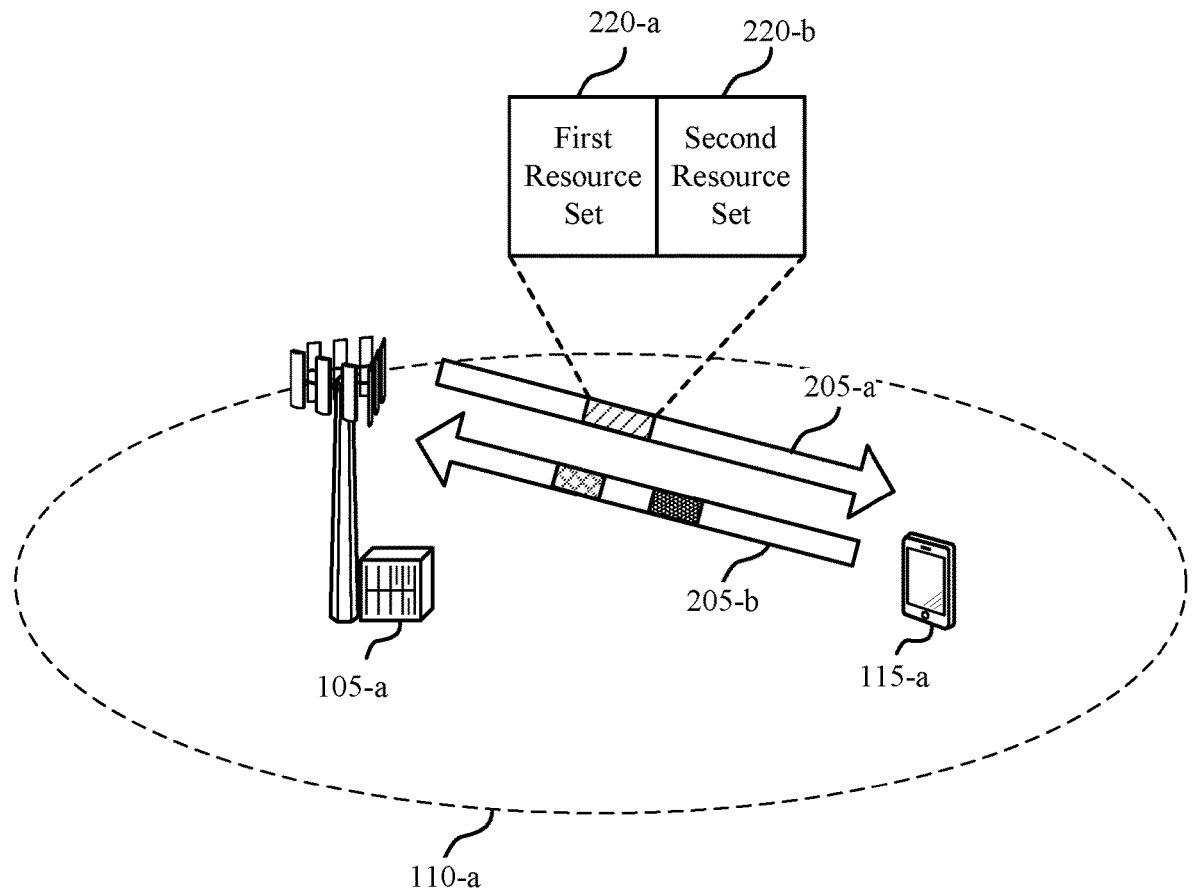
FIGS. 2 and 3 illustrate examples of wireless communications networks that support resource set configuration reporting with multiple channel and interference measurements in accordance with aspects of the present disclosure.

FIG. 2 illustrates an example of a wireless communications network 200 that supports resource set configuration reporting with multiple channel and interference measurements in accordance with aspects of the present disclosure. In some examples, wireless communications network 200 may implement aspects of wireless communications system 100. For example, the wireless communications network 200 may include base station 105-a and UE 115-a, which may be examples of a base station 105 and a UE 115 as described with reference to FIG. 1. Base station 105-a may serve a geographic coverage area 110-a. In some cases, base station 105-a may configure UE 115-a to measure and report multiple resource set measurements in one or more measurement reports.

In wireless communications network 200, base station 105-a may communicate with UE 115-a. In some cases, base station 105-a and UE 115-a may communicate via one or more transmission beams, that allows base station 105-a and UE 115-a to communicate over communication links 205. For example, base station 105-a may transmit signals to UE 115-a via communication link 205-a (e.g., a downlink communication link) and UE 115-a may transmit signals to base station 105-b via communication link 205-b (e.g., an uplink communication link). In some cases, UE 115-a and base station 105-a may perform a beam management procedure to maintain reliable communication links via transmit and receive beams, where the beam management procedure may include UE 115-b receiving one or more reporting configuration messages 210 from base station 105-a via communication link 205-a and include UE 115-a transmitting one or more measurement reports 215 to base station 105-a via communication link 205-b.

Wireless communications network 200 may support one or more beam management procedures to establish and maintain reliable communications between base station 105-a and the UE 115-a. As part of the beam management procedure, base station 105-a may transmit a reporting configuration message 210 (e.g., an RRC configuration message, RRC reconfiguration message) that may indicate one or more resource sets (e.g., time resources, frequency resources, beams) for UE 115-a to measure. In some cases, UE 115-a may be configured to measure beam management related signals (e.g., SSBs, zero power and non-zero power CSI-RSs) that will be transmitted by base station 105-a over the set of resources. Accordingly, the UE 115-a may measure a reporting quantity or metric, such as RSRP (e.g., L1-RSRP) or SINR (e.g., L1-SINR), associated with one or more resources sets.

In some examples, the base station 105-a may transmit a reporting configuration to the UE 115-a that may include multiple resource sets that the UE 115-a may use to conduct various measurements for beam management. In some implementations, the multiple resource sets may be associated with different antenna panels, or may be associated with communications with different transmission reception points (TRPs) within the wireless communications network 200. In some examples, the base station 105-a may configure resources as one or more CMR sets (e.g., as a first resource set 220-a), IMR sets (e.g., as a second resource set 220-b), or both, in report configuration message 210. The base station 105-a may transmit the report configuration to UE 115-a via control signaling such as RRC signaling, and the UE 115-a may use these configured resources (e.g., CMR, IMR, or both) to perform measurements and to feedback report quantities such as RSRP or SINR to the base station 105-a for each resource set of the multiple configured resource sets. Based on the measurements, the base station 105-a may schedule transmissions with the UE 115-a using one or more "best" beams (e.g., beams having high signal strength and high overall communications quality) and associated transmission configuration indicator (TCI) states.

To support individual measurements for each set of resources included in the report configuration message 210 (e.g., SINR/RSRP measurements), the UE 115-a may generate one measurement report to send to the base station 105-a per resource set (e.g., a measurement for each set of multiple configured resource sets) configured in the report configuration message 210. The report configuration message 210 may include a number of parameters that the UE 115-a may use to generate measurement reports. In some implementations, the report configuration may be an information element (e.g., a CSI-ReportConfig IE). The report configuration may indicate a report configuration type that is based on time domain behavior of the resources indicated in the configured resource sets. In some examples, UE 115-a may be configured to perform beam management related measurements and reporting aperiodically, semi-persistently, or periodically as indicated in the report configuration. For each reporting type, UE 115-a may receive the measurement report configuration message 210 via RRC signaling, where the measurement configuration message 210 may indicate the report type (e.g., aperiodic, semi-persistent, or periodic). In the case of periodic reporting, the measurement report configuration message 210 may indicate a periodicity at which UE 115-a is to report a measurement report. In the case of aperiodic or semi-persistent reporting, UE 115-a may additionally or alternatively receive an activation or trigger message (e.g., a CSIReport-Config trigger stat) that triggers UE 115-a to perform the aperiodic or semi-persistent reporting. Further, the report type may indicate how many resources sets are configured in the report configuration message 210. For example, aperiodic reporting may support multiple resource sets per reporting configuration, where periodic and semi-persistent reporting types may support one resource set per reporting configuration.

In addition, the reporting configuration may include a report configuration ID (e.g., the CSI-ReportConfigID) which may include an information field indicating a carrier and bandwidth part for which the report configuration is intended. The report configuration may indicate one or more resource settings each containing multiple resource sets. In some examples, the report configuration may indicate resource sets for channel measurement (resourcesForChannelMeasurement), for interference measurements (csi-IM-ResourcesForInterference, nzp-CSI-RS-ResourcesForInterference), or both. For example, the report configuration may indicate a resource setting for channel measurement and interference measurement including (for the latter) resources based on a zero power (zp) configuration, a non-zero power configuration, or both. Each resource setting (e.g., for interference and/or channel measurement (resourcesForChannelMeasurement, csi-IM-Resources ForInterference, or nzp-CSI-RS-ResourcesForInterference)) may indicate multiple resource sets. Each resource setting may be identified by a resource configuration ID in the report reconfiguration, where each resource configuration ID contains a list of one or more resource set IDs which are associated with a set of physical resources such as CSI-RS resources, SSB resources, CSI resources for interference measurement, etc.

To provide additional information to the base station 105-a during measurement reporting, the UE 115-a may be configured to report different measurements for each resource set configured in the report configuration. For example, the UE 115-a may report measurements 215 to the base station 105-a separately for each resource set of the multiple configured resource sets. In cases where the associated report quantity (e.g., SINR, RSRP) for each resource set is different, the UE 115-a may identify each resource set configured in the resource configuration as a different group, and may report a measurement quantity for each resource set.

In some cases, the UE 115-a may identify a mapping between resource sets and between corresponding resources contained in the resource sets. In one example, the report configuration message 210 may include a number of CMR sets and a number of IMR sets. The UE 115-a may identify a mapping between CMR sets and IMR sets that the UE 115-a may use for computing a measurement quantity such as SINR using the mapping between resource sets or corresponding resources. For example, the mapping may be a one-to-one mapping based on an ordering or a listing of the resource sets, such that a first CMR resource set in the CMR sets may correspond to the first IMR resource set in the IMR sets, a second CMR resource set in the CMR sets may correspond to the second IMR resource set in the IMR sets, and so forth. Additionally or alternatively, the mapping may extend to the resource level within each resource set, where a first CMR resource of the first CMR resource set corresponds to a first IMR resource of the IMR resource set, a second CMR resource in the first CMR resource set may correspond to a second IMR resource set in the first IMR resource set, and so forth. In some examples, the UE 115-a may compute a report quantity for each resource in each resource set, and may report a measurement of a resource in each resource set (e.g., the top or highest RSRP or SINR measurement).

In some cases, measurement reporting per resource set as described herein may indicate that the UE 115-a supports group-based beam reporting for the different report quantities in different resource sets, and the UE 115-a may select resources from configured resource sets when groupBasedBeamReporting is enabled by the report configuration message 210 (e.g., in CSI-ReportConfig IE). For example, when multiple resource sets are configured by the base station 105-a in the report configuration message 210, the UE 115-a may determine that base station 105-a may simultaneously transmit a beam using a resource per resource set. In addition, receiving a report configuration that has multiple resource sets may implicitly indicate to the UE 115-a that the base station 105-a is able to simultaneously transmit using multiple transmission beams associated with the different resource sets (e.g., one beam per resource set). For example, the base station 105-a may use a first set of beams to respectively transmit a reference signal in each resource of a first resource set, and may use a second set of beams to respectively transmit a reference signal in each resource of a second resource set. The UE 115-a may report back a highest measurement and corresponding resource in each resource set (e.g., one measurement per resource set), the base station 105-a may use the reported resources to select corresponding transmission beams (e.g., a first selected transmission beam from the first set of beams corresponding to the reported resource in the first set and a second selected transmission beam from the second set of beams corresponding to the reported resource in the second set) to send subsequent or simultaneous transmissions using the selected transmission beams.

In one example, the UE 115-a may be configured with a resource configuration that includes group based beam reporting that may identify a number of beams associated with a number of CMR resource sets and a number of beams associated with IMR sets. The UE 115-a may identify that the beams are from different resource sets (e.g., CMR sets or IMR sets), which may implicitly indicate that the beams from the different sets are simultaneously transmittable by the base station 105-a. As such, the group based beam reporting configuration may indicate to the UE 115-a that may select beams from different resource sets to be simultaneously transmitted.

Figure 3:
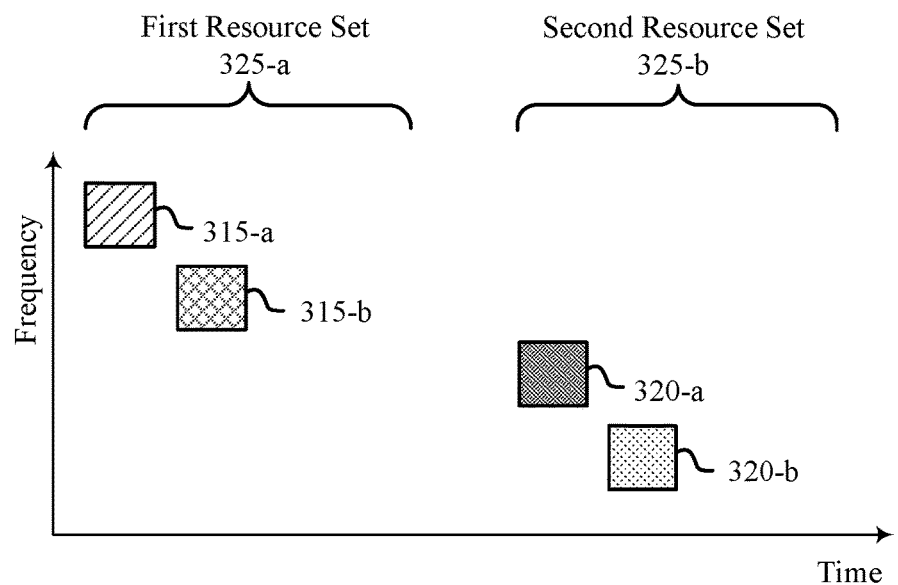
Figure 3:
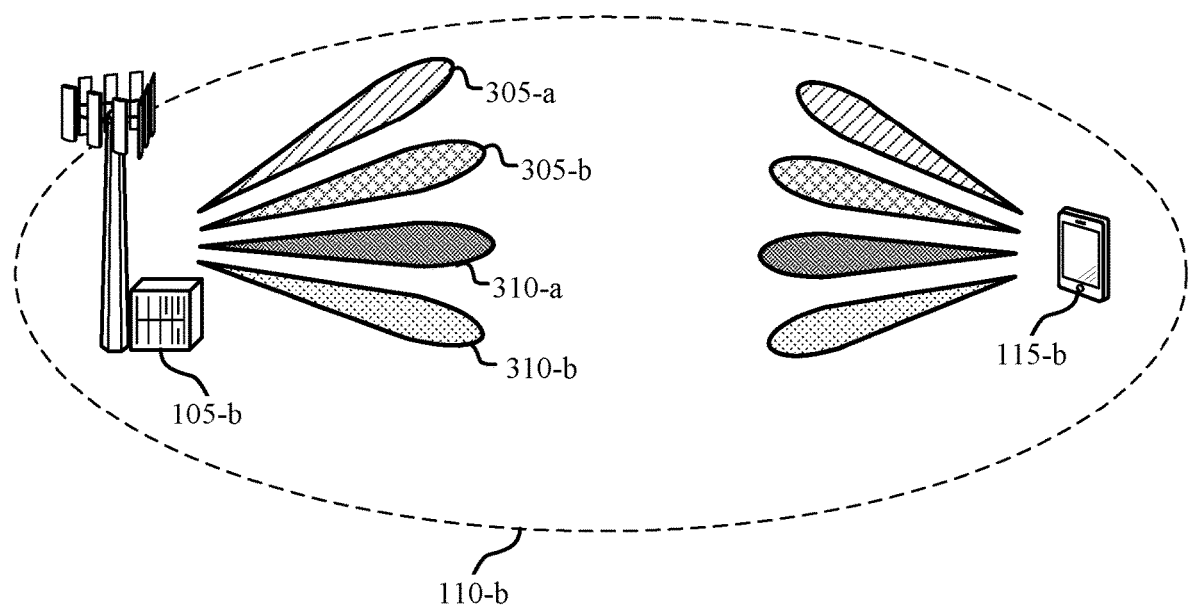

FIG. 3 illustrates an example of a wireless communications network 300 that supports resource set configuration reporting with multiple channel and interference measurements in accordance with aspects of the present disclosure. In some examples, wireless communications network 300 may implement aspects of wireless communications system 100. For example, the wireless communications network 300 may include base station 105-b and UE 115-b, which may be examples of a base stations 105 and a UEs 115 as described with reference to FIGS. 1 and 2. Base station 105-b may serve a geographic coverage area 110-b. In some cases, base station 105-b and UE 115-b may employ various beam management techniques.

In some cases, the base station 105-b and the UE 115-b may support directional beamforming and communications via one or more directional beams. For example, the base station 105-b and the UE 115-b may communicate via downlink beams or uplink beams, or both, and may perform directional transmissions using one or more directional beams 305. Further, the directional beams used by the base station 105-b and the UE 115-b may be associated with a number of resource sets such as a first resource set 325-a and a second resource set 325-b, which may be examples of time resources, frequency resources, a channel, medium, etc.

In some cases, resource sets 325-a and 325-b may be resource sets that are configured for channel measurements, interference measurements, or both, for communications between base station 105-b and UE 115-b. In some cases, communications quality may change, which may affect the signal strength or signal quality, or both, of transmissions between base station 105-b and UE 115-b. To maintain communications quality between the base station 105-b and the UE 115-b, the base station 105-b and the UE 115-b may perform one or more beam management procedures. As part of the beam management procedure, base station 105-b may transmit a configuration message (e.g., an RRC configuration message, RRC reconfiguration message) that may indicate one or more sets of resources (e.g., CMR resources or IMR resources associated with associated beams) for UE 115-*b* to measure, and a reporting quantity for UE 115-*b* to measure the set of resources in accordance with. For example, the UE 115-*b* may measure a reporting quantity such as RSRP (e.g., L1-RSRP) or SINR (e.g., L1-SINR), of the one or more signals associated with the channel.

The base station 105-*b* may transmit a report configuration message via RRC signaling to UE 115-*b* that indicates a set of resources for UE 115-*b* to measure, and a reporting quantity to measure the set of resources in accordance with. In addition, the reporting configuration may include a rule (e.g., a rule such as a priority rule or a ranking rule) that the UE 115-*b* may use for ranking different beams using different reporting quantities (e.g., RSRP or SINR). Based on the rule, the UE 115-*b* may identify a best beam (or M best beams) in accordance with an identified reporting quantity or metric. In some cases, the rule may be explicitly signaled to the UE 115-*b* (e.g., via RRC signaling) or the UE 115-*b* may retrieve the rule from memory.

In a first example, the UE 115-*b* may apply a scaling factor to measurements of a first reporting quantity (e.g., L1-RSRP) such that the scaled first reporting quantity may be compared to measurements of a second reporting quantity (e.g., L1-SINR). In some aspects, the scaling factor may effectively weight or normalize the two metrics, and the UE 115-*b* may compare the different metrics, and may select the best M beams based on the comparison of the scaled measurements. The UE 115-*b* may report the best beams in a measurement report selected using the scaled metrics. In some cases, the scaling factor may be dynamically signaled or changed via control signaling. In some other examples, some report quantities (e.g., L1-RSRP or SINR) may be prioritized over other reporting quantities.

In some other examples, the rule may be signaled by the base station 105-*b* for dynamically adjusting the UE reporting. For example, the base station 105-*b* may indicate the scaling factor via control signaling such as an RRC, a MAC-CE, or downlink control information (DCI) messaging. In some other cases, the rule may be determined based on the order in which the report quantities are specified by the base station 105-*b* (e.g., in a reporting configuration).

Base station 105-*b* may indicate time and frequency resources, such as the first resource set 325-*a* including time and/or frequency resources 315-*a* and 315-*b*, and the second resource set 325-*b* including time and/or frequency resources 320-*a* and 320-*b*. Each resource set may be associated with a corresponding beam. For example, beam 305-*a* may be associated with resource 315-*a* and beam 305-*b* may be associated with resource 315-*b* of the first resource set, while beam 310-*a* may be associated with resource 320-*a* and beam 320-*b* may be associated with resource 320-*b* of the first resource set. UE 115-*b* may measure the signals received over the one or more beams 305 and 310 in accordance with the configured reporting quantity. For example, UE 115-*b* may measure RSRP or SINR of the received signals in accordance with the rule. For example, UE 115-*b* may be configured to measure RSRP over beams 305 corresponding to resources of the first resource set, and the UE 115-*b* may be configured to measure SINR over beams 310 corresponding to resources of the second resource set. As such, UE 115-*b* may generate choose the M best beams associated with measurements made for each resource set (e.g., corresponding to the highest measurements), and may report the M best beams back to the base station 105-*b*. The base station 105-*b* may use to determine a preferred beam 305 or 310 to use for communicating with UE 115-*b* based on the reported measurements.

Figure 4:
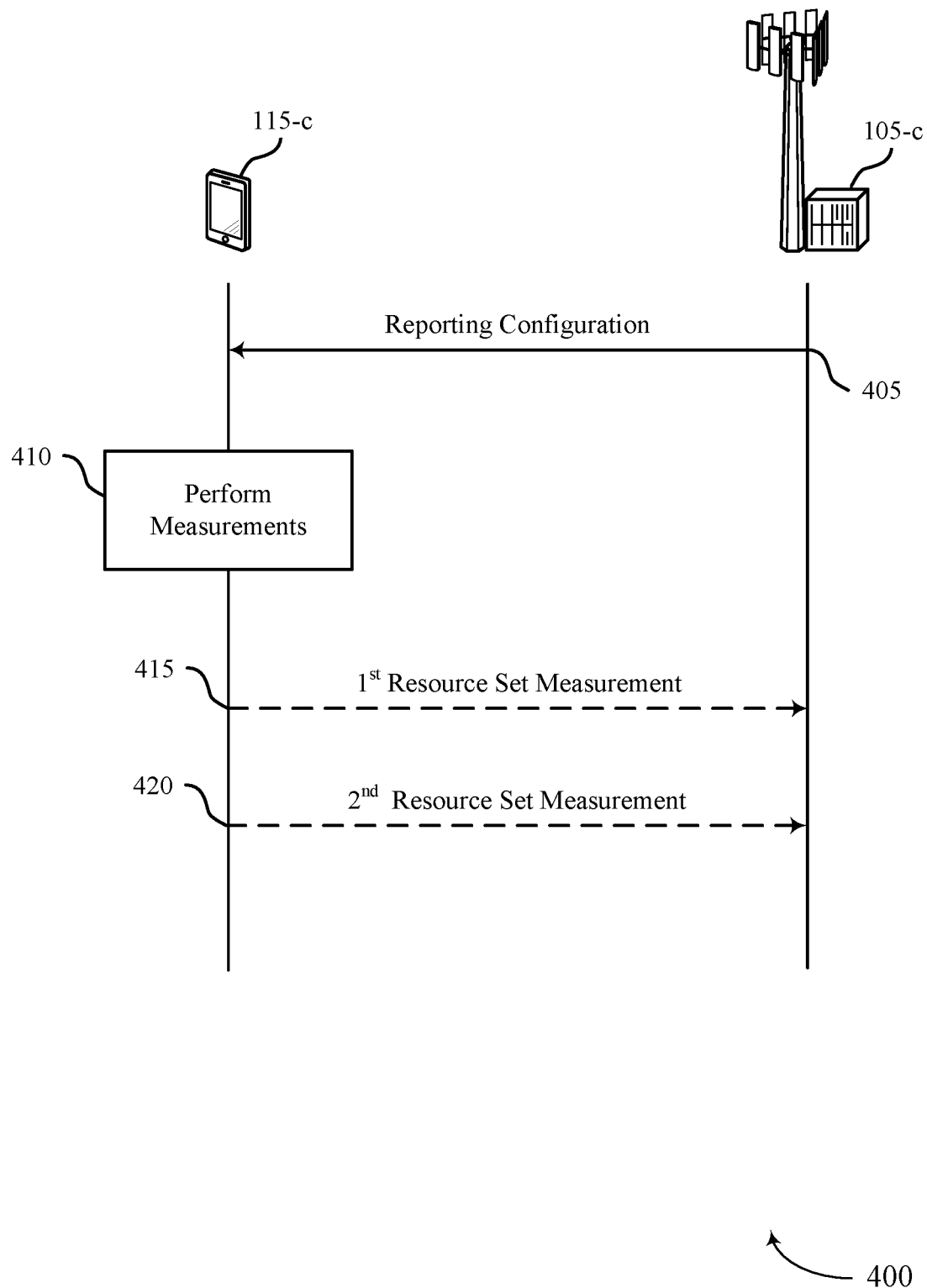
FIGS. 4 and 5 illustrate examples of process flows that support resource set configuration reporting with multiple channel and interference measurements in accordance with aspects of the present disclosure.

FIG. 4 illustrates an example of a process flow 400 that supports resource set configuration reporting with multiple channel and interference measurements in accordance with aspects of the present disclosure. In some examples, process flow 400 may implement aspects of wireless communications system 100. The process flow 400 includes UE 115-*c* and base station 105-*c* (e.g., which may be examples of the corresponding devices described with reference to FIGS. 1-3). Alternative examples of the following may be implemented, where some steps are performed in a different order than described or are not performed at all. In some cases, steps may include additional features not mentioned below, or further steps may be added. In addition, while process flow 400 shows processes between base station 105-*c* and a single UE 115-*c*, it should be understood that these processes may occur between any number of network devices.

At 405 the base station 105-*c* may transmit, and the UE 115-*c* may receive, a reporting configuration message that configures the UE 115-*c* to generate a measurement report (e.g., per resource configuration, resource setting, etc.). In some examples, the measurement report indicates a first resource ID of the first resource, a second resource ID of the second resource, or both. The measurement report may indicate a first resource set that includes a first number of resources and a second resource set that includes a second number of resources that are different from the first number of resources. In some examples, the first resource set may include a first set of CMR resources and a first set of IMR resources, and the second resource set may include a resource set of CMR resources and a resource set of IMR resources. The UE 115-*c* may be, for example, configured to report one or more SINR measurements using the first set of CMR resources and the first set of IMR resources corresponding to a resource of the first resource set (e.g., CMR/IMR resource in first resource set with the highest SINR), and may be configured to report one or more SINR measurements using the second set of CMR resources and the second set of IMR resources corresponding to a resource of the second resource set (e.g., a CMR/IMR resource in second resource set with the highest SINR).

In some examples, the reporting configuration may indicate a first plurality of resource sets and a second plurality of resource sets. In some examples, the first plurality of resource sets may be associated with channel measurements (e.g., multiple CMR sets), and the second plurality of resource sets may be associated with interference measurements (e.g., multiple IMR sets). The reporting configuration may further include a mapping between each resource set of the first plurality of resource sets and each resource set of the second plurality of resource sets. For example, the mapping may be a one-to-one mapping, such that a first resource set of the first plurality of resource sets (e.g., first CMR set of multiple CMR sets) may correspond to a first resource set of the second plurality of resource sets (e.g., first IMR set of multiple IMR sets). Similarly, a second resource set of the first plurality of resource sets may correspond to a second resource set of the second plurality of resource sets, and so on. In some examples, the UE 115-*c* may be configured to calculate a reporting quantity based on the mapping. For example, the UE may calculate an SINR or RSRP value based on the mapping between resource sets (e.g., the mapping between CMR and IMR sets).

At 410, the UE 115-*c* may perform a first plurality of measurements of the first plurality of resources of the first resource set and a second plurality of measurements of the second plurality of resources of the second resource set. In some examples each measurement of the first plurality of measurements corresponds to a respective resource of the first resource set (e.g., an RSRP measurement for each resource in a first CMR set), and each measurement of the second plurality of measurements corresponds to a respective resource from the second resource set (e.g., an RSRP measurement for each resource in a second CMR set).

In some examples, the first resource set is a first CMR set and the second resource set is a second CMR set. In some other examples, the first resource set is a first IMR set and the second resource set is a second IMR set. The UE 115-c may perform a number of different measurements in accordance with different signaling metrics or reporting quantities. For example, the first plurality of measurements and the second plurality of measurements may include one or more SINR measurements, RSRP measurements, or both. For example, the first plurality of measurements may be SINR measurements of each resource in the first resource set, and the second plurality of measurements may be RSRP measurements of each resource in the second resource set.

At 415, the UE 115-c may report a first resource set measurement, and at 420, the UE 115-c may report a second resource set measurement. For example, the UE 115-c may transmit a measurement report indicating a first measurement of the first plurality of measurements corresponding to a first resource of the first plurality of resources of the first resource set (e.g., a highest RSRP measurement of the CMR resources of the first CMR resource set), and a second measurement of the second plurality of measurements corresponding to a second resource of the second plurality of resources of the second resource set (e.g., a highest RSRP measurement of the CMR resources of the second CMR resource set). In some examples, the measurement report may include an identifier of the resource being reported in each set (e.g., a first resource identifier of the CMR resource in the first CMR resource set with the highest RSRP and a second resource identifier of the CMR resource in the second CMR resource set with the highest RSRP). In some cases, the UE 115-c may transmit a first measurement report indicating the first measurement, and may transmit a second measurement report indicating the second measurement (e.g., in a single transmission). In such cases, the second measurement report is transmitted separate from the first measurement report (e.g., in separate transmissions or a single transmission from UE 115-c). In some other cases, the UE 115-c may transmit the first measurement and the second measurement in at least one measurement report, for example, the first measurement and the second measurement may be included in a single measurement report. Additionally or alternatively, the UE 115-c may transmit multiple measurement reports (e.g., one measurement report per resource set).

In some examples, the UE 115-c may identify, from the reporting configuration message, a request for group beam reporting from the base station 105-c. Based on the beam reporting request, the UE 115-c may transmit at least one measurement report indicating the first measurement corresponding to the first resource of the first resource set and the second measurement corresponding to the second resource of the second resource set based at least in part on the request for group beam reporting. For example, based on the beam reporting request, the UE 115-c may implicitly determine to report back resources from respective resource sets that it may simultaneously receive.

Figure 5:
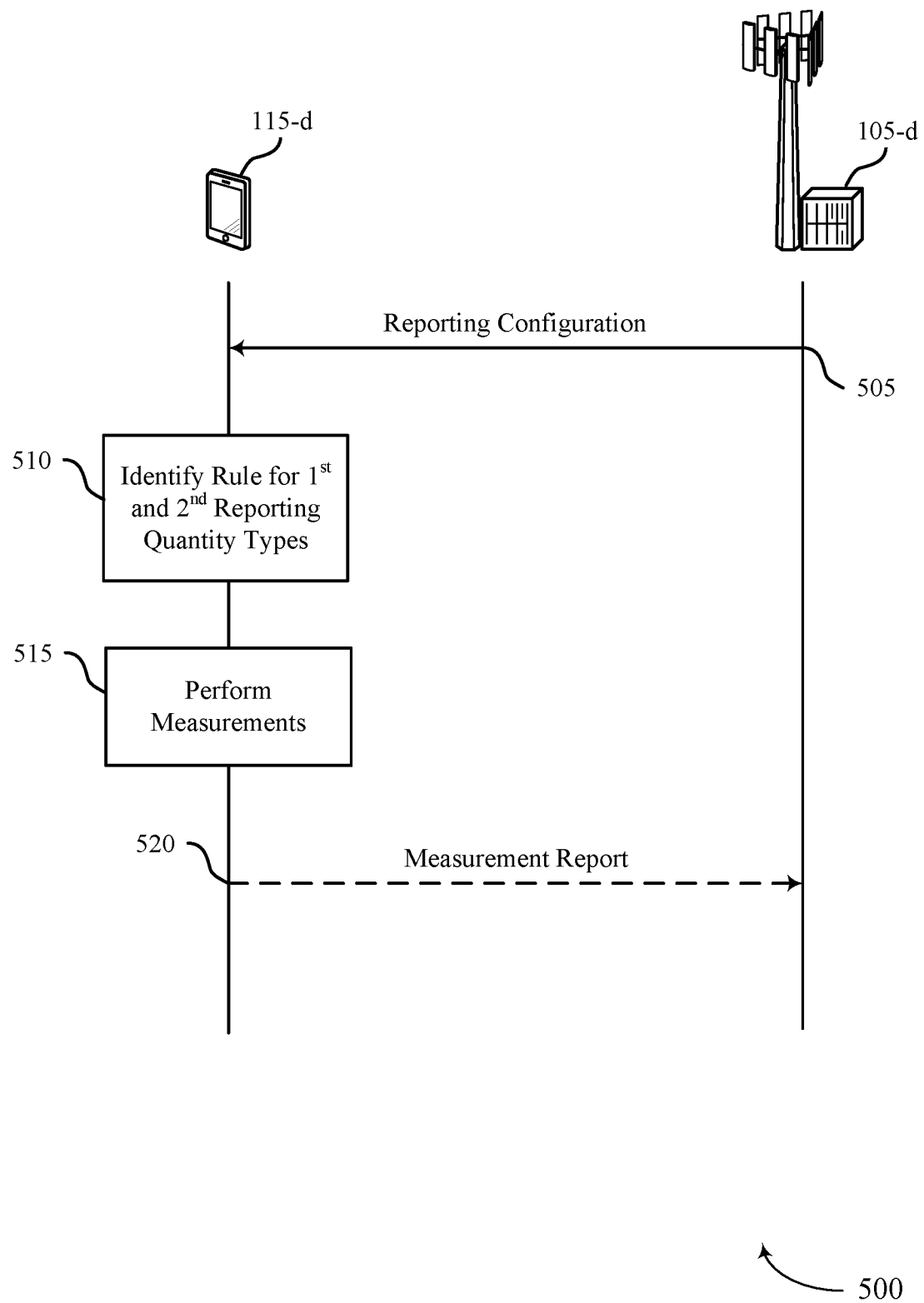

FIG. 5 illustrates an example of a process flow 500 that supports resource set configuration reporting with multiple channel and interference measurements in accordance with aspects of the present disclosure. In some examples, process flow 500 may implement aspects of wireless communications system 100. The process flow 500 includes UE 115-d and base station 105-d (e.g., which may be examples of the corresponding devices described with reference to FIGS. 1-4). Alternative examples of the following may be implemented, where some steps are performed in a different order than described or are not performed at all. In some cases, steps may include additional features not mentioned below, or further steps may be added. In addition, while process flow 500 shows processes between base station 105-d and a single UE 115-d, it should be understood that these processes may occur between any number of network devices.

At 505, the base station 105-d may transmit, and the UE 115-d may receive, a reporting configuration message that configures the UE 115-d to measure a plurality of resources using a first reporting quantity type and a second reporting quantity type. In some examples, the first reporting quantity type is an RSRP measurement, and the second reporting quantity type is an SINR measurement, although other reporting quantity types are possible. The configuration message may indicate one or more resource sets that each include one or more resources for measurement.

At 510, the UE 115-d may identify a rule for ranking a measurement of the first reporting quantity type relative to a measurement of the second reporting quantity type. In some examples, the UE 115-d may identify the rule by receiving control signaling from the base station 105-d (e.g., via an RRC message, a MAC-CE, DCI, or any combination thereof) that includes an indication of the rule. The rule may indicate how to compare a measurement of a first reporting quantity type to a measurement of second reporting quantity type (e.g., a scaling factor to compare an SINR measurement to an RSRP measurement).

At 515, the UE 115-d may perform a first plurality of measurements of at least a first subset of the plurality of resources in accordance with the first reporting quantity type. The UE 115-d may further perform a second plurality of measurements of at least a second subset of the plurality of resources in accordance with the second reporting quantity type. The plurality of resources may be in a same resource set or in different resource sets.

In some cases, the UE 115-d may receive control signaling that indicates the rule that includes a scaling factor to apply to one or more measurements of the first reporting quantity type, or to one or more measurements of the second reporting quantity type, or both. In some cases, the measurement report indicates the subset of the plurality of resources selected based at least in part on the scaling factor.

In some other cases, an order in which the first reporting quantity type and the second reporting quantity type occur within the reporting configuration message indicates the rule. Additionally or alternatively, the UE 115-d may retrieve the rule from memory. The rule may indicate that the UE 115-d is to report a defined number of measurements (e.g., M measurements), and that the measurements are to be of a first quantity type that satisfy a threshold (e.g., M SINR measurements that meet or exceed an SINR threshold), and to report measurements of the second quantity type if there is an insufficient number of measurements of the first quantity type that satisfy the threshold such that the UE 115-d reports the defined number of measurements.

At 520, the UE 115-d may transmit a measurement report indicating a subset of the plurality of resources selected based on the rule. The base station 105-*d* may use the measurement report to select transmission beams corresponding to the reported measurements for use in subsequent transmissions to the UE 115-*d*.

Figure 6:
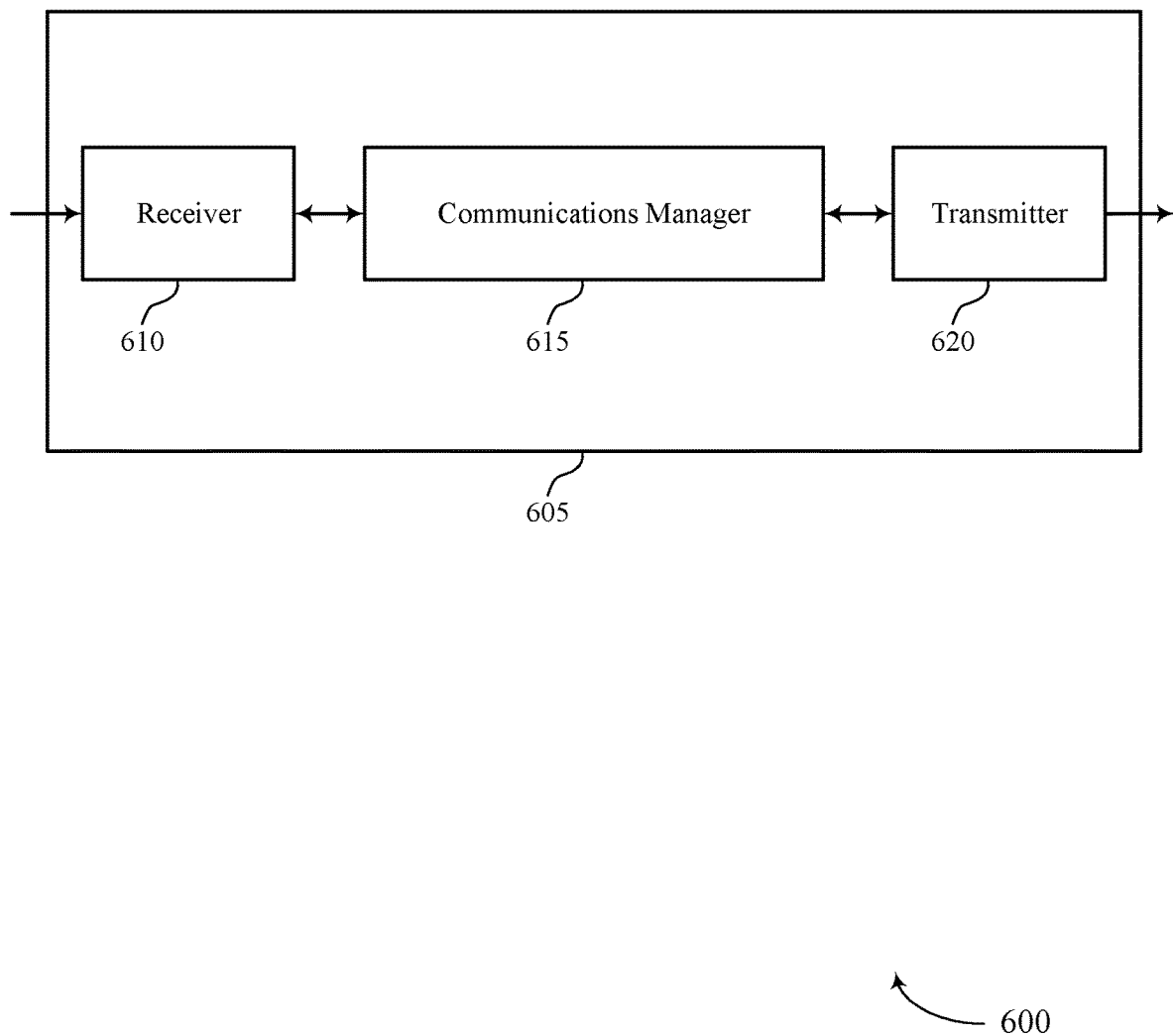
FIGS. 6 and 7 show block diagrams of devices that support resource set configuration reporting with multiple channel and interference measurements in accordance with aspects of the present disclosure.

FIG. 6 shows a block diagram 600 of a device 605 that supports resource set configuration reporting with multiple channel and interference measurements in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource set configuration reporting with multiple channel and interference measurements, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a reporting configuration message that configures the UE to generate a measurement report that indicates a first resource set including a first set of resources and a second resource set including a second set of resources that are different from the first set of resources, perform a first set of measurements of the first set of resources of the first resource set and a second set of measurements of the second set of resources of the second resource set, and transmit at least one measurement report indicating a first measurement of the first set of measurements corresponding to a first resource of the first set of resources of the first resource set, and a second measurement of the second set of measurements corresponding to a second resource of the second set of resources of the second resource set. The communications manager 615 may also receive, from a base station, a reporting configuration message that configures the UE to measure a set of resources using a first reporting quantity type and a second reporting quantity type, identify a rule for ranking a measurement of the first reporting quantity type relative to a measurement of the second reporting quantity type, perform a first set of measurements of at least a first subset of the set of resources in accordance with the first reporting quantity type and a second set of measurements of at least a second subset of the set of resources in accordance with the second reporting quantity type, and transmit a measurement report indicating a subset of the set of resources selected based on the rule. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, and antennas) coupled with the mobile device modem to enable wireless transmission and reception.

The communications manager 615 as described herein may be implemented to realize one or more potential advantages. At least one implementation may enable communications manager 615 to effectively generate one or more measurement reports indicating one or more resource measurements associated with one or more resource sets. In some other implementations, the communications manager 615 may identify a rule for ranking measurements associated with different reporting quantities that the communications manager 615 may use for beam management procedures.

Based on implementing the techniques as described herein, one or more processors of the device 605 (e.g., processor(s) controlling or incorporated with one or more of receiver 610, communications manager 615, and transmitter 620) may effectively reduce signaling overhead associated with beam measurement reporting. In some other examples, the techniques described herein may allow devices such as device 605 to effectively select high quality beams and associated resources, which may increase system efficiency and communications quality.

Figure 7:
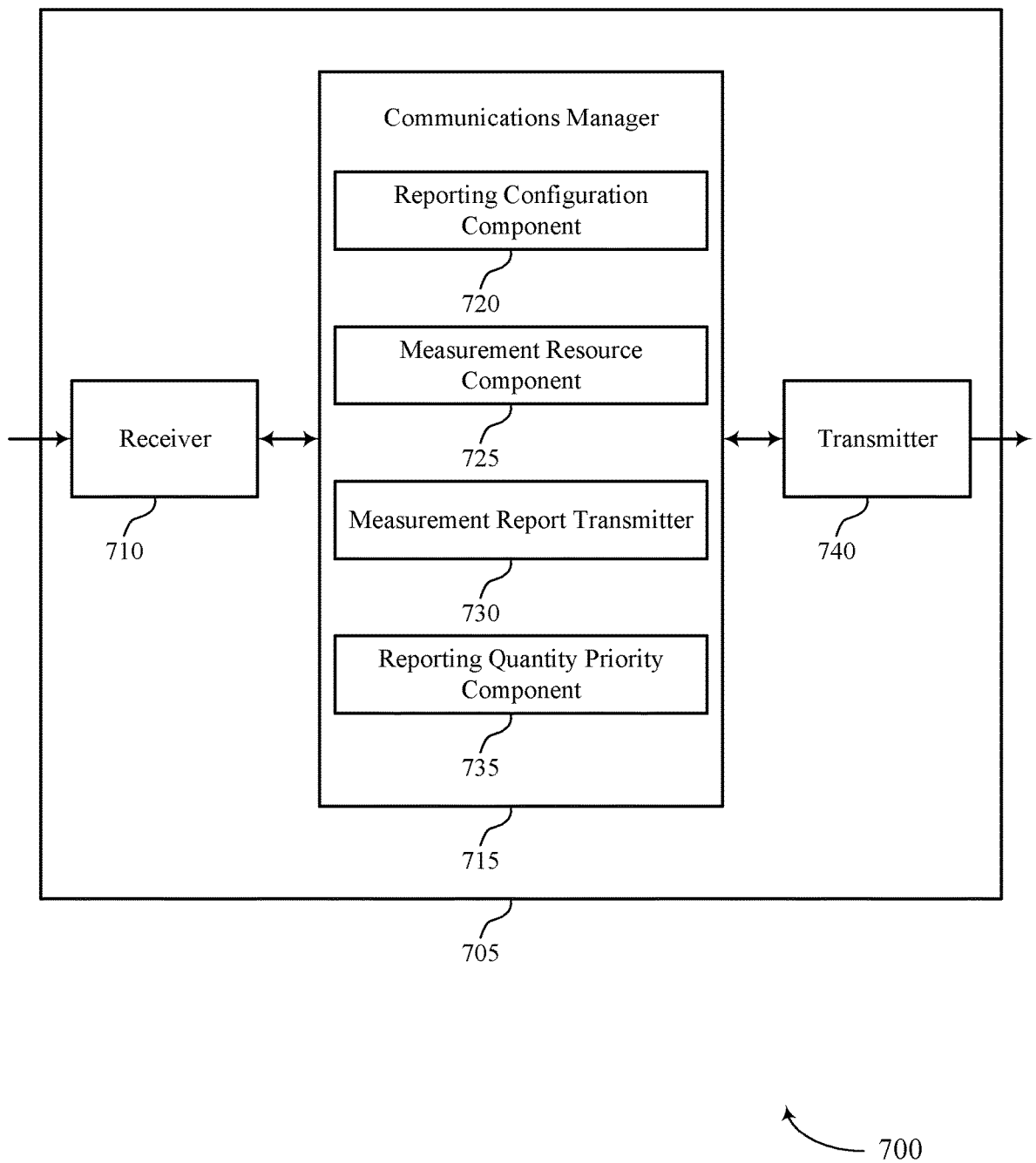

FIG. 7 shows a block diagram 700 of a device 705 that supports resource set configuration reporting with multiple channel and interference measurements in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to resource set configuration reporting with multiple channel and interference measurements, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reporting configuration component 720, a measurement resource component 725, a measurement report transmitter 730, and a reporting quantity priority component 735. The communications manager 715 may be an example of aspects of the communications manager 910 described herein.

The reporting configuration component 720 may receive, from a base station, a reporting configuration message that configures the UE to generate a measurement report that indicates a first resource set including a first set of resources and a second resource set including a second set of resources that are different from the first set of resources.

The measurement resource component 725 may perform a first set of measurements of the first set of resources of the first resource set and a second set of measurements of the second set of resources of the second resource set.

The measurement report transmitter 730 may transmit at least one measurement report indicating a first measurement of the first set of measurements corresponding to a first resource of the first set of resources of the first resource set, and a second measurement of the second set of measurements corresponding to a second resource of the second set of resources of the second resource set.

The reporting configuration component 720 may receive, from a base station, a reporting configuration message that configures the UE to measure a set of resources using a first reporting quantity type and a second reporting quantity type.

The reporting quantity priority component 735 may identify a rule for ranking a measurement of the first reporting quantity type relative to a measurement of the second reporting quantity type.

The measurement resource component 725 may perform a first set of measurements of at least a first subset of the set of resources in accordance with the first reporting quantity type and a second set of measurements of at least a second subset of the set of resources in accordance with the second reporting quantity type.

The measurement report transmitter 730 may transmit a measurement report indicating a subset of the set of resources selected based on the rule.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
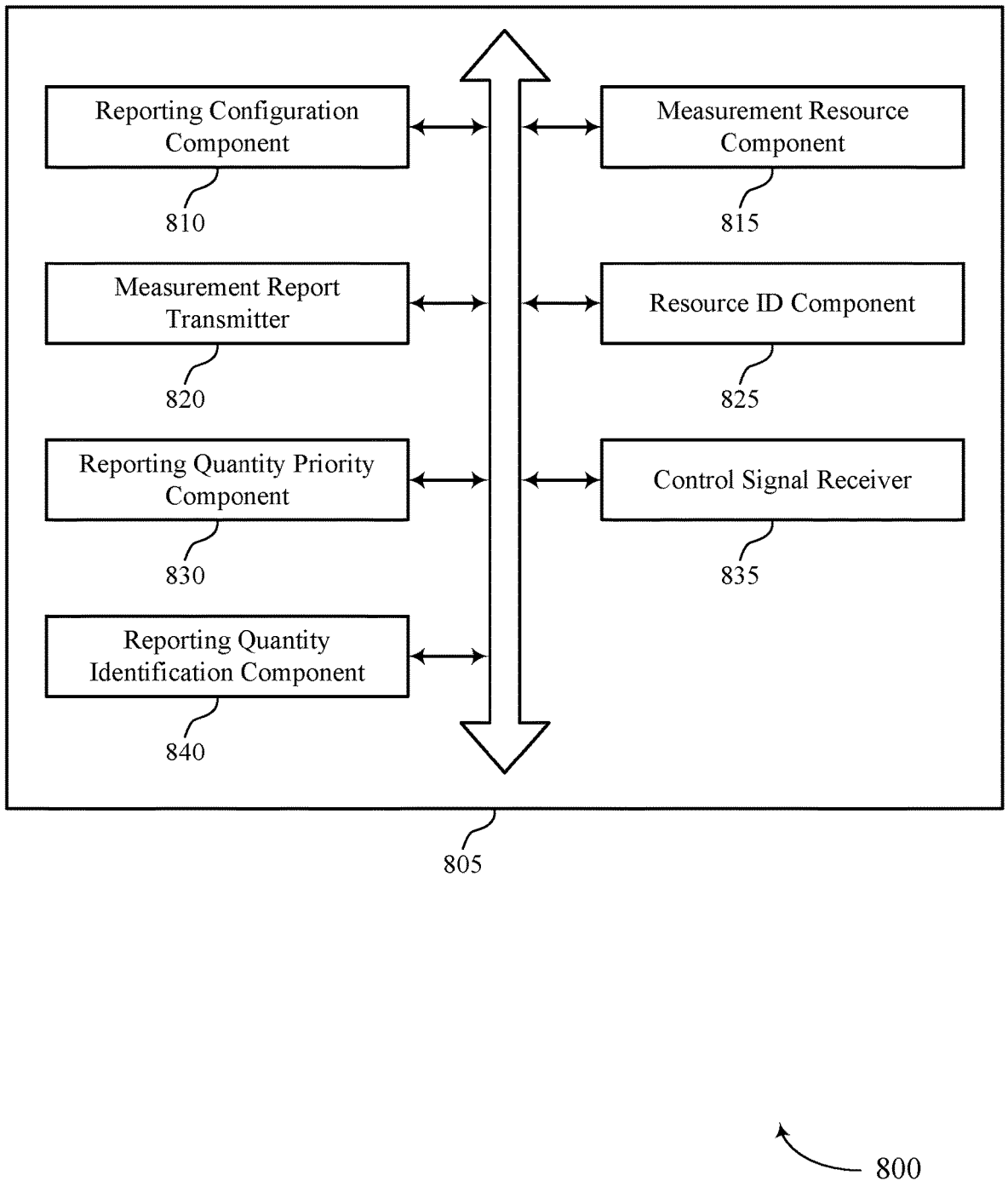
FIG. 8 shows a block diagram of a communications manager that supports resource set configuration reporting with multiple channel and interference measurements in accordance with aspects of the present disclosure.

FIG. 8 shows a block diagram 800 of a communications manager 805 that supports resource set configuration reporting with multiple channel and interference measurements in accordance with aspects of the present disclosure. The communications manager 805 may be an example of aspects of a communications manager 615, a communications manager 715, or a communications manager 910 described herein. The communications manager 805 may include a reporting configuration component 810, a measurement resource component 815, a measurement report transmitter 820, a resource ID component 825, a reporting quantity priority component 830, a control signal receiver 835, and a reporting quantity identification component 840. Each of these modules may communicate, directly or indirectly, with one another (e.g., via one or more buses).

The reporting configuration component 810 may receive, from a base station, a reporting configuration message that configures the UE to generate a measurement report that indicates a first resource set including a first set of resources and a second resource set including a second set of resources that are different from the first set of resources.

In some examples, the reporting configuration component 810 may receive, from a base station, a reporting configuration message that configures the UE to measure a set of resources using a first reporting quantity type and a second reporting quantity type. In some examples, the reporting configuration component 810 may receive the reporting configuration message that indicates a first set of resource sets and a second set of resources sets, and a respective mapping between each resource set of the first set of resource sets and each resource set of the second set of resource sets. In some cases, the first set of resource sets include a set of channel measurement resource sets and the second set of resource sets includes a set of interference measurement resource sets.

The measurement resource component 815 may perform a first set of measurements of the first set of resources of the first resource set and a second set of measurements of the second set of resources of the second resource set. The resource ID component 825 may identify that the measurement report indicates a first resource identifier of the first resource, a second resource identifier of the second resource, or both.

In some examples, the measurement resource component 815 may perform a first set of measurements of at least a first subset of the set of resources in accordance with the first reporting quantity type and a second set of measurements of at least a second subset of the set of resources in accordance with the second reporting quantity type. In some cases, each measurement of the first set of measurements corresponds to a respective resource of the first resource set. In some cases, each measurement of the second set of measurements corresponds to a respective resource from the second resource set.

In some cases, the first resource set is a first channel measurement resource set and the second resource set is a second channel measurement resource set, or the first resource set is a first interference measurement resource set and the second resource set is a second interference measurement resource set. In some cases, the first set of measurements and the second set of measurements include one or more SINR measurements, RSRP measurements, or both.

The measurement report transmitter 820 may transmit at least one measurement report indicating a first measurement of the first set of measurements corresponding to a first resource of the first set of resources of the first resource set, and a second measurement of the second set of measurements corresponding to a second resource of the second set of resources of the second resource set. In some examples, the measurement report transmitter 820 may transmit a first measurement report indicating the first measurement.

In some examples, the measurement report transmitter 820 may transmit a second measurement report indicating the second measurement, where the second measurement report is transmitted separate from the first measurement report based on the reporting configuration message.

In some examples, the reporting configuration component 810 may receive the reporting configuration message that indicates a request for group beam reporting. In some examples, the measurement report transmitter 820 may transmit the at least one measurement report indicating the first measurement corresponding to the first resource and the second measurement corresponding to the second resource based on the request for group beam reporting.

In some examples, the measurement report transmitter 820 may transmit a measurement report indicating a subset of the set of resources selected based on the rule. The reporting quantity priority component 830 may identify a rule for ranking a measurement of the first reporting quantity type relative to a measurement of the second reporting quantity type. In some examples, receiving, from the base station, control signaling that includes an indication of the rule. In some examples, the reporting quantity priority component 830 may retrieve the rule from a memory of the UE.

In some examples, the reporting configuration component 810 may receive the reporting configuration message where an order in which the first reporting quantity type and the second reporting quantity type occur within the reporting configuration message indicates the rule.

The control signal receiver 835 may receive control signaling that indicates the rule that is a scaling factor to apply to one or more measurements of the first reporting quantity type, or to one or more measurements of the second reporting quantity type, or both, where the measurement report indicates the subset of the set of resources selected based on the scaling factor. In some cases, the control signaling includes a RRC message, a medium access control (MAC) control element (CE), DCI, or any combination thereof.

The reporting quantity identification component 840 may indicate reporting quantity types, for example, the first reporting quantity type may be an RSRP measurement, and the second reporting quantity type is an SINR measurement.

Figure 9:
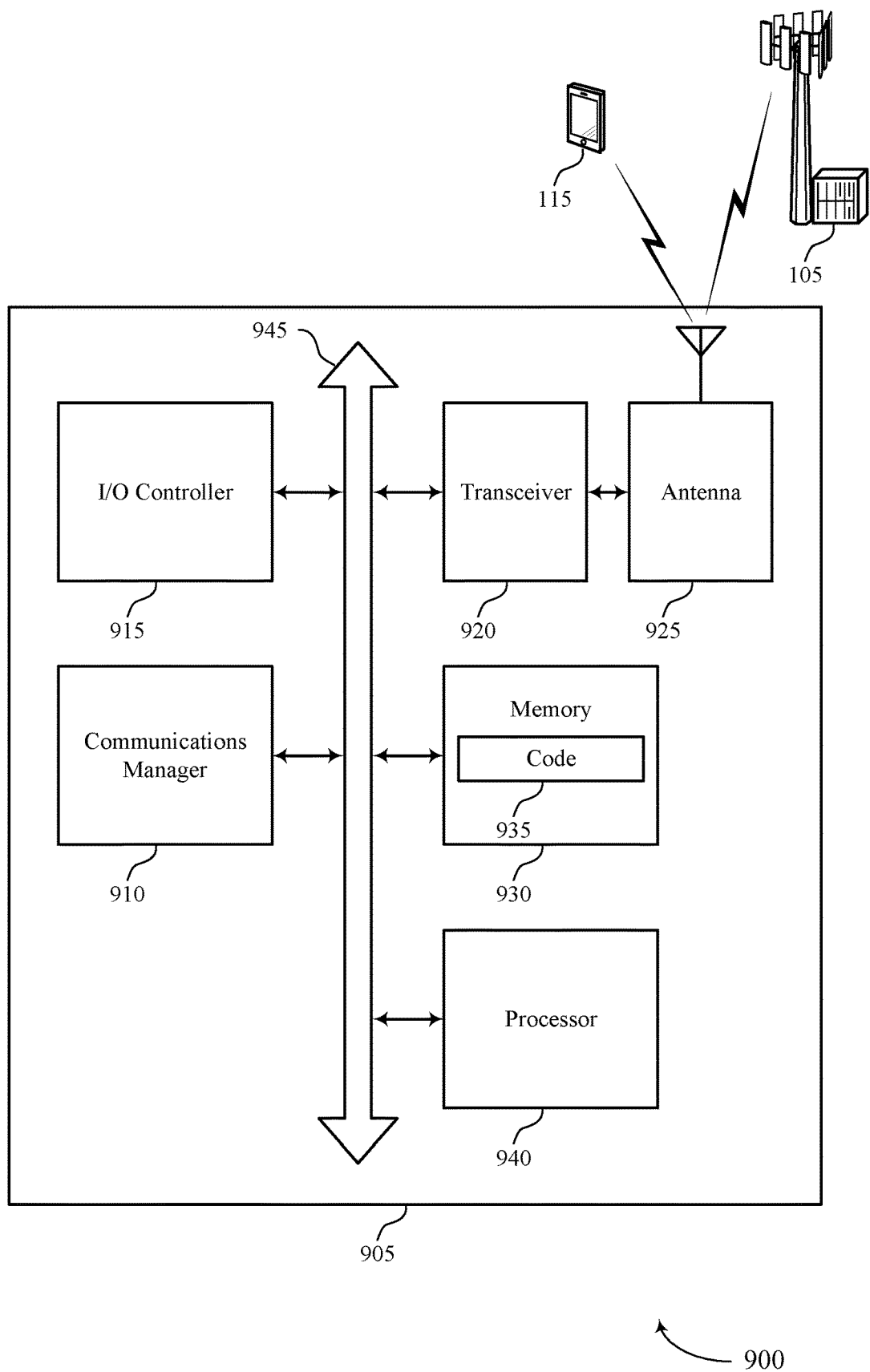
FIG. 9 shows a diagram of a system including a device that supports resource set configuration reporting with multiple channel and interference measurements in accordance with aspects of the present disclosure.

FIG. 9 shows a diagram of a system 900 including a device 905 that supports resource set configuration reporting with multiple channel and interference measurements in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a reporting configuration message that configures the UE to generate a measurement report that indicates a first resource set including a first set of resources and a second resource set including a second set of resources that are different from the first set of resources, perform a first set of measurements of the first set of resources of the first resource set and a second set of measurements of the second set of resources of the second resource set, and transmit at least one measurement report indicating a first measurement of the first set of measurements corresponding to a first resource of the first set of resources of the first resource set, and a second measurement of the second set of measurements corresponding to a second resource of the second set of resources of the second resource set. The communications manager 910 may also receive, from a base station, a reporting configuration message that configures the UE to measure a set of resources using a first reporting quantity type and a second reporting quantity type, identify a rule for ranking a measurement of the first reporting quantity type relative to a measurement of the second reporting quantity type, perform a first set of measurements of at least a first subset of the set of resources in accordance with the first reporting quantity type and a second set of measurements of at least a second subset of the set of resources in accordance with the second reporting quantity type, and transmit a measurement report indicating a subset of the set of resources selected based on the rule.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource set configuration reporting with multiple channel and interference measurements).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
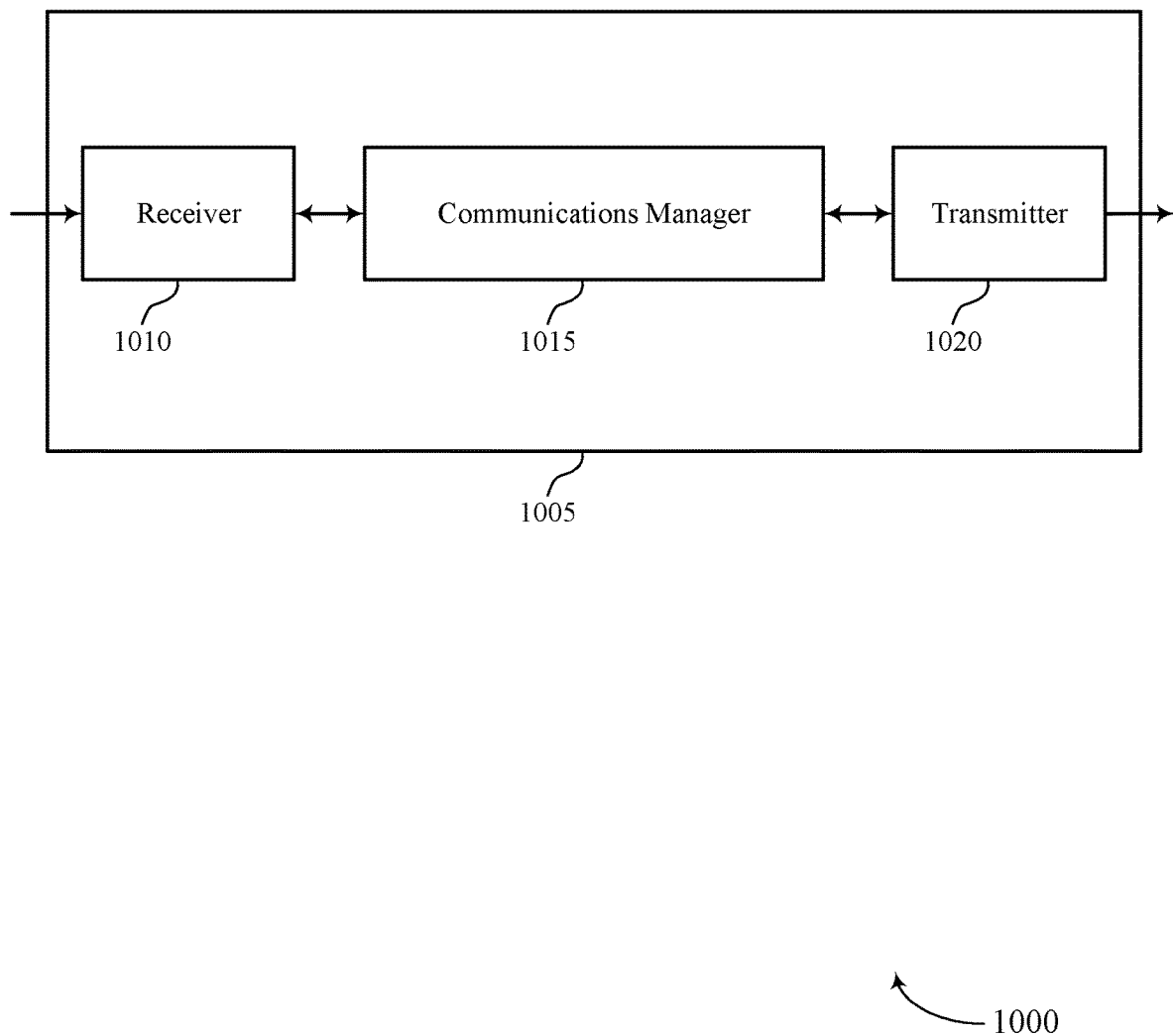
FIGS. 10 and 11 show block diagrams of devices that support resource set configuration reporting with multiple channel and interference measurements in accordance with aspects of the present disclosure.

FIG. 10 shows a block diagram 1000 of a device 1005 that supports resource set configuration reporting with multiple channel and interference measurements in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource set configuration reporting with multiple channel and interference measurements, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a reporting configuration message that configures a UE to generate a measurement report that indicates a first resource set including a first set of resources and a second resource set including a second set of resources that are different from the first set of resources and receive the measurement report indicating a first measurement corresponding to a first resource of the first set of resources of the first resource set, and a second measurement corresponding to a second resource of the second set of resources of the second resource set. The communications manager 1015 may also transmit a reporting configuration message that configures a UE to measure a set of resources using a first reporting quantity type and a second reporting quantity type and receive a measurement report indicating a subset of the set of resources selected based on a rule for ranking a measurement of the first reporting quantity type relative to a measurement of the second reporting quantity type. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, communications manager 1015 may be implemented as an integrated circuit or chipset for a mobile device modem, and the receiver 1010 and transmitter 1020 may be implemented as analog components (e.g., amplifiers, filters, and antennas) coupled with the mobile device modem to enable wireless transmission and reception.

The communications manager 1015 as described herein may be implemented to realize one or more potential advantages. At least one implementation may enable communications manager 1015 to effectively generate one or more measurement reports indicating one or more resource measurements associated with one or more resource sets. In some other implementations, the communications manager 1015 may identify or establish a rule for ranking measurements associated with different reporting quantities that the communications manager 1015 may use for beam management procedures.

Based on implementing the techniques as described herein, one or more processors of the device 1005 (e.g., processor(s) controlling or incorporated with one or more of receiver 1010, communications manager 1015, and transmitter 1020) may effectively reduce latency and signaling overhead associated with beam measurement reporting. In some other examples, the techniques described herein may allow devices such as device 1005 to effectively communicate via high quality beams and associated resources, which may increase system efficiency and communications quality.

Figure 11:
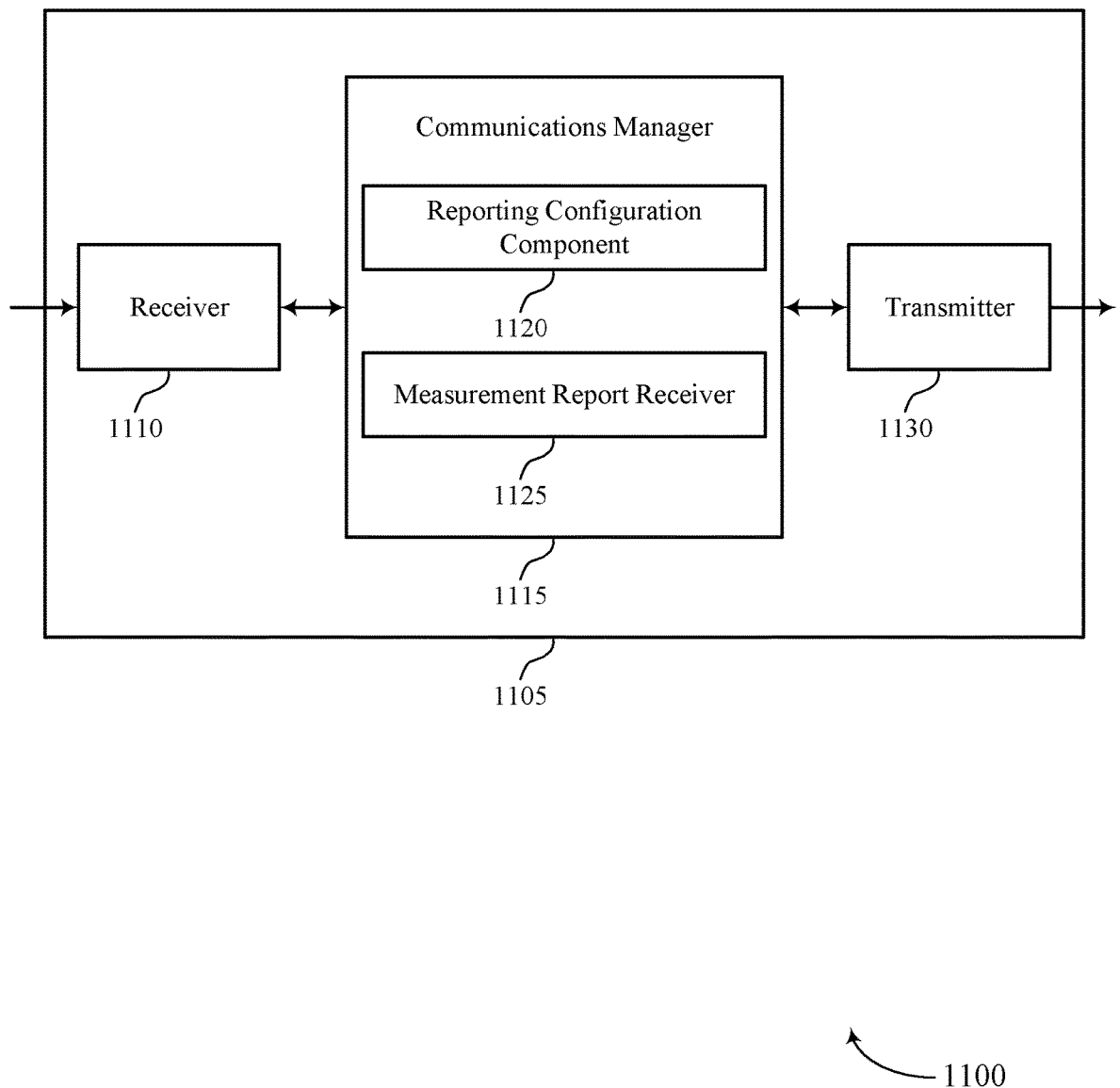

FIG. 11 shows a block diagram 1100 of a device 1105 that supports resource set configuration reporting with multiple channel and interference measurements in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to resource set configuration reporting with multiple channel and interference measurements, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reporting configuration component 1120 and a measurement report receiver 1125. The communications manager 1115 may be an example of aspects of the communications manager 1310 described herein.

The reporting configuration component 1120 may transmit a reporting configuration message that configures a UE to generate a measurement report that indicates a first resource set including a first set of resources and a second resource set including a second set of resources that are different from the first set of resources.

The measurement report receiver 1125 may receive the measurement report indicating a first measurement corresponding to a first resource of the first set of resources of the first resource set, and a second measurement corresponding to a second resource of the second set of resources of the second resource set.

The reporting configuration component 1120 may transmit a reporting configuration message that configures a UE to measure a set of resources using a first reporting quantity type and a second reporting quantity type.

The measurement report receiver 1125 may receive a measurement report indicating a subset of the set of resources selected based on a rule for ranking a measurement of the first reporting quantity type relative to a measurement of the second reporting quantity type.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
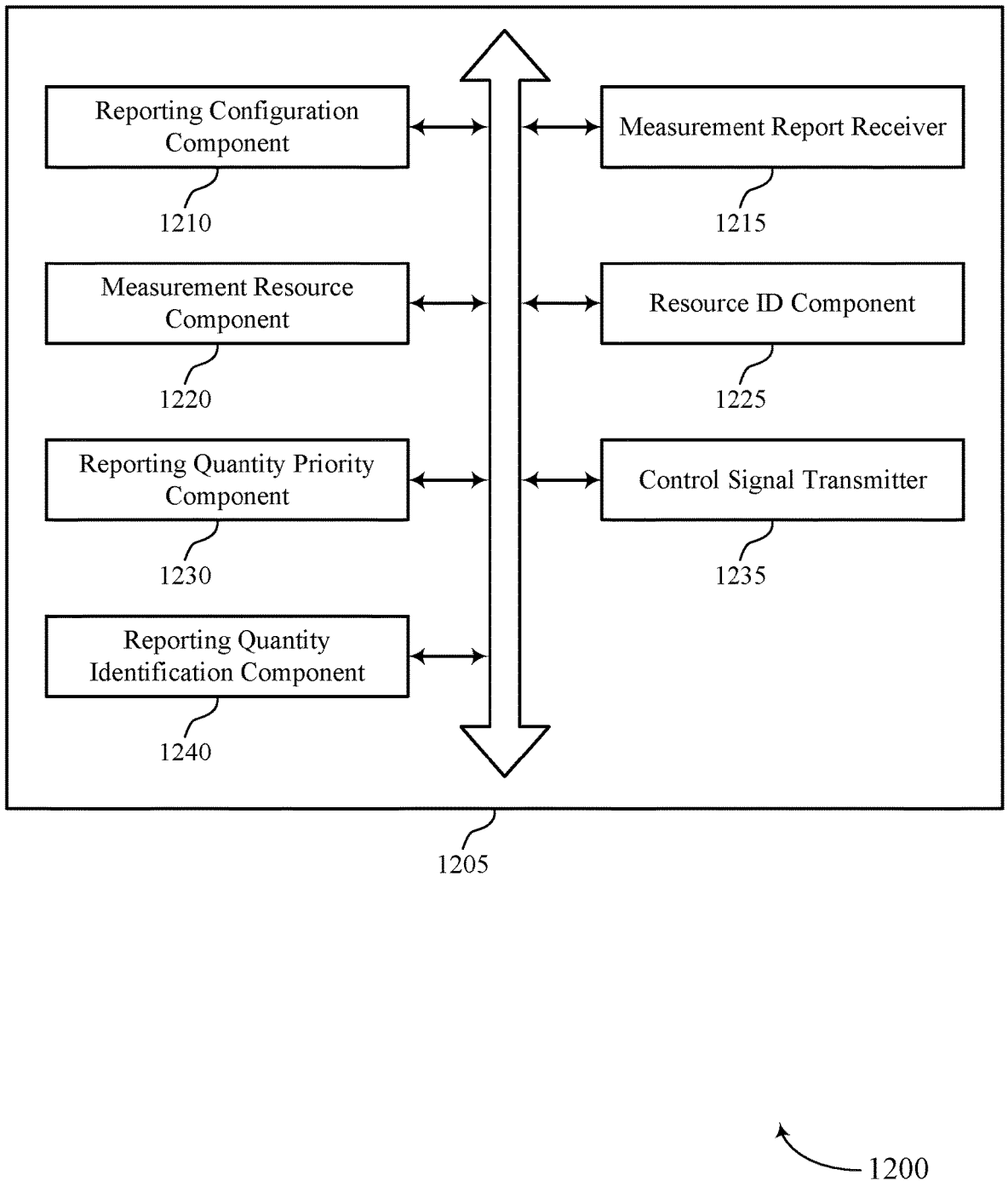
FIG. 12 shows a block diagram of a communications manager that supports resource set configuration reporting with multiple channel and interference measurements in accordance with aspects of the present disclosure.

FIG. 12 shows a block diagram 1200 of a communications manager 1205 that supports resource set configuration reporting with multiple channel and interference measurements in accordance with aspects of the present disclosure. The communications manager 1205 may be an example of aspects of a communications manager 1015, a communications manager 1115, or a communications manager 1310 described herein. The communications manager 1205 may include a reporting configuration component 1210, a measurement report receiver 1215, a measurement resource component 1220, a resource ID component 1225, a reporting quantity priority component 1230, a control signal transmitter 1235, and a reporting quantity identification component 1240. Each of these modules may communicate, directly or indirectly, with one another (e.g., via one or more buses).

The reporting configuration component 1210 may transmit a reporting configuration message that configures a UE to generate a measurement report that indicates a first resource set including a first set of resources and a second resource set including a second set of resources that are different from the first set of resources. In some examples, the reporting configuration component 1210 may transmit a reporting configuration message that configures a UE to measure a set of resources using a first reporting quantity type and a second reporting quantity type.

In some examples, the reporting configuration component 1210 may transmit the reporting configuration message that indicates a first set of resource sets and a second set of resources sets, and a respective mapping between each resource set of the first set of resource sets and each resource set of the second set of resource sets. In some cases, the first set of resource sets include a set of channel measurement resource sets and the second set of resource sets include a set of interference measurement resource sets.

The measurement report receiver 1215 may receive the measurement report indicating a first measurement corresponding to a first resource of the first set of resources of the first resource set, and a second measurement corresponding to a second resource of the second set of resources of the second resource set. In some examples, the measurement report receiver 1215 may receive a first measurement report indicating the first measurement.

In some examples, the measurement report receiver 1215 may receive a second measurement report indicating the second measurement, where the second measurement report is transmitted separate from the first measurement report based on the reporting configuration message. The resource ID component 1225 may identify that the measurement report indicates a first resource identifier of the first resource, a second resource identifier of the second resource, or both.

In some examples, the reporting configuration component 1210 may transmit the reporting configuration message that indicates a request for group beam reporting at the UE. In some examples, the measurement report receiver 1215 may receive the measurement report indicating the first measurement corresponding to the first resource and the second measurement corresponding to the second resource based on the request for group beam reporting.

The measurement resource component 1220 may identify that a measurement of a first set of measurements corresponds to a respective resource of the first resource set. In some cases, each measurement of a second set of measurements corresponds to a respective resource from the second resource set.

In some cases, the first resource set is a first channel measurement resource set and the second resource set is a second channel measurement resource set, or the first resource set is a first interference measurement resource set and the second resource set is a second interference measurement resource set.

In some cases, the first measurement and the second measurement include one or more of an SINR measurement or an RSRP measurement.

In some examples, the measurement report receiver 1215 may receive a measurement report indicating a subset of the set of resources selected based on a rule for ranking a measurement of the first reporting quantity type relative to a measurement of the second reporting quantity type. In some examples, the reporting configuration component 1210 may transmit the reporting configuration message where an order in which the first reporting quantity type and the second reporting quantity type occur within the reporting configuration message indicates the rule. The reporting quantity priority component 1230 may transmit, to the UE, control signaling that includes an indication of the rule.

The reporting quantity identification component 1240 may identify the first reporting quantity type as an RSRP measurement, and the first reporting quantity type as one or more SINR measurements.

The control signal transmitter 1235 may transmit control signaling that indicates the rule that is a scaling factor to apply to one or more measurements of the first reporting quantity type, or to one or more measurements of the second reporting quantity type, or both, where the measurement report indicates the subset of the set of resources selected based on the scaling factor. In some cases, the control signaling includes a RRC message, a MAC-CE, DCI, or any combination thereof.

Figure 13:
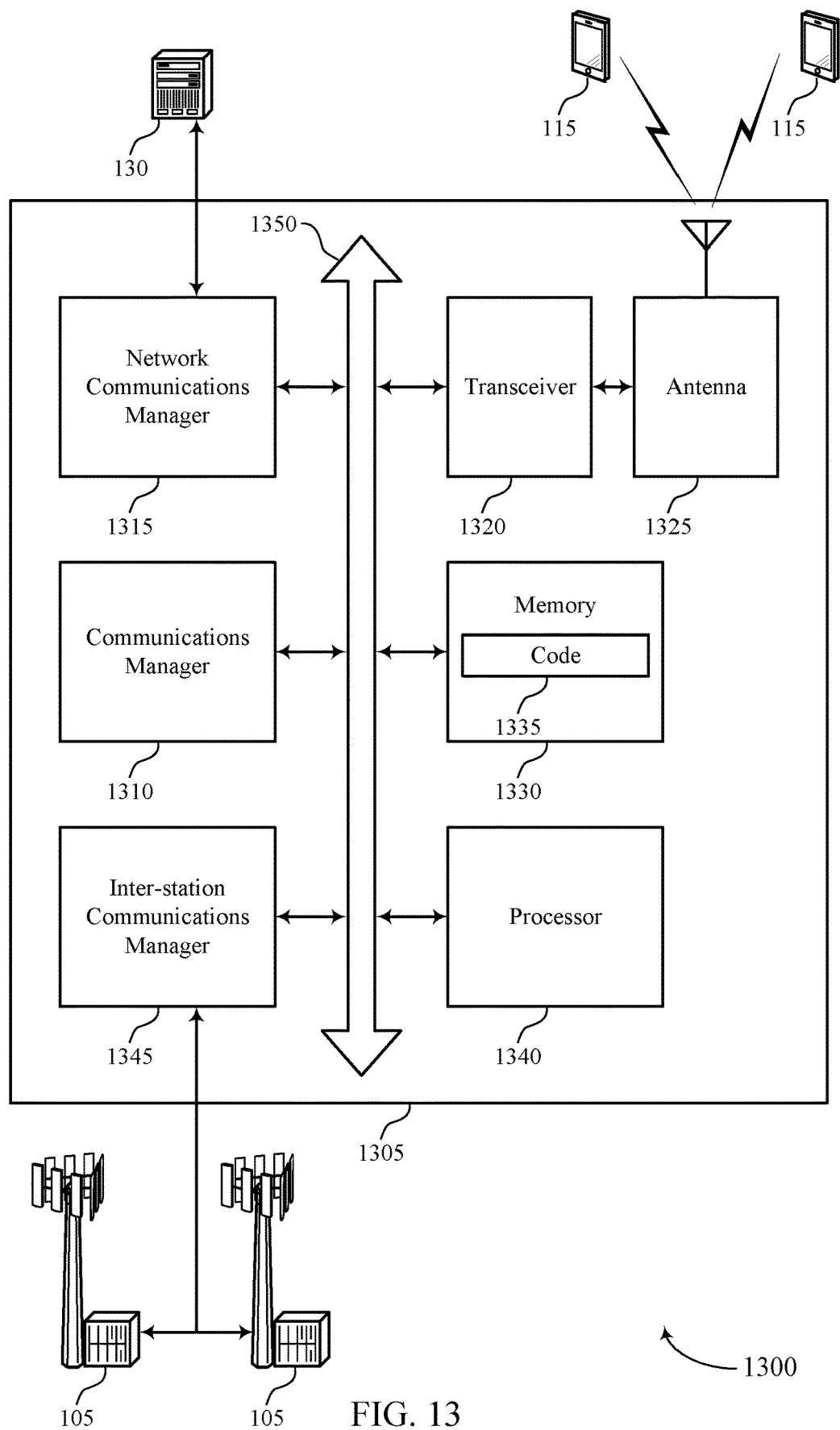
FIG. 13 shows a diagram of a system including a device that supports resource set configuration reporting with multiple channel and interference measurements in accordance with aspects of the present disclosure.

FIG. 13 shows a diagram of a system 1300 including a device 1305 that supports resource set configuration reporting with multiple channel and interference measurements in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a reporting configuration message that configures a UE to generate a measurement report that indicates a first resource set including a first set of resources and a second resource set including a second set of resources that are different from the first set of resources and receive the measurement report indicating a first measurement corresponding to a first resource of the first set of resources of the first resource set, and a second measurement corresponding to a second resource of the second set of resources of the second resource set. The communications manager 1310 may also transmit a reporting configuration message that configures a UE to measure a set of resources using a first reporting quantity type and a second reporting quantity type and receive a measurement report indicating a subset of the set of resources selected based on a rule for ranking a measurement of the first reporting quantity type relative to a measurement of the second reporting quantity type.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting resource set configuration reporting with multiple channel and interference measurements).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
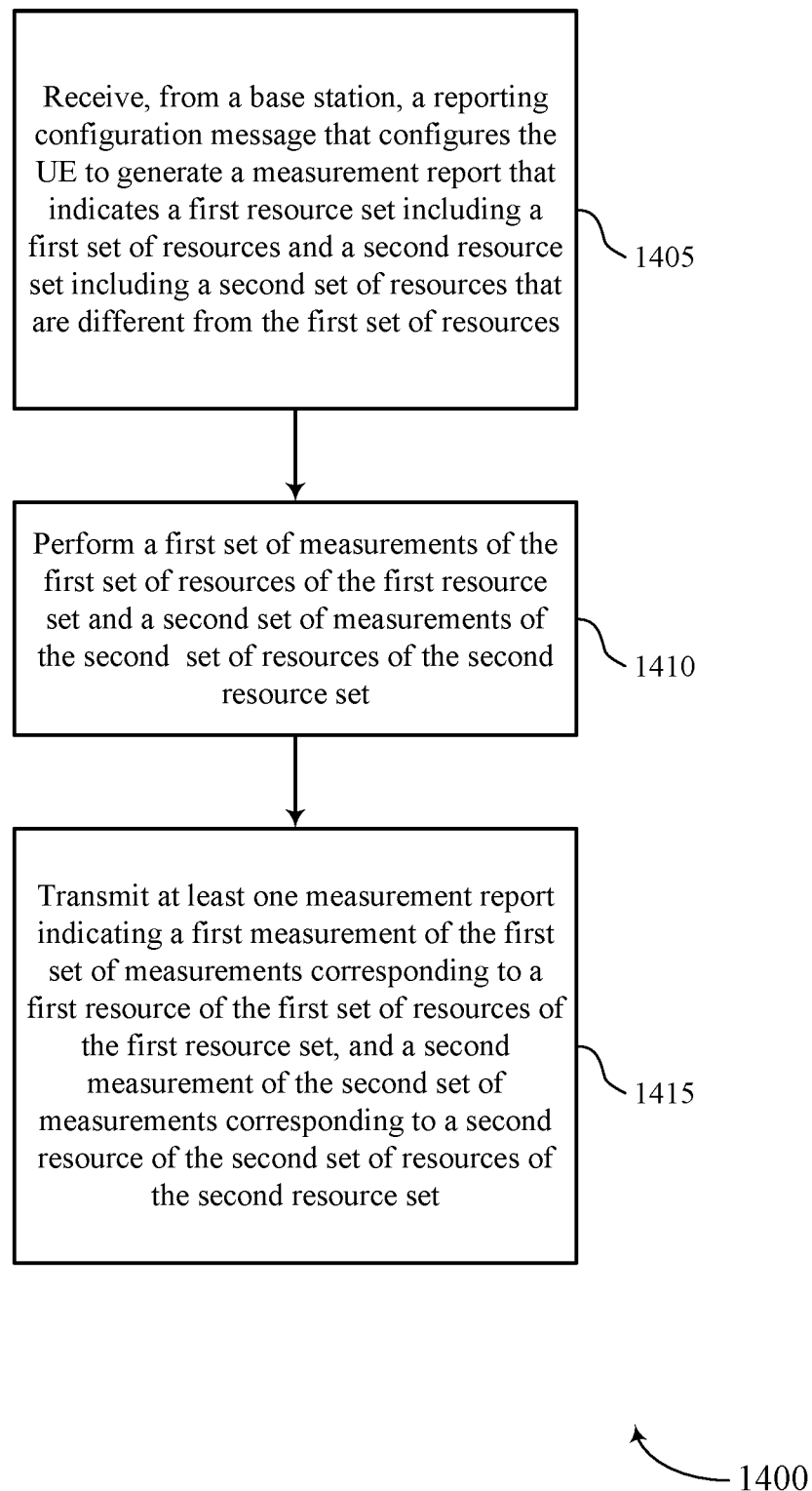
FIGS. 14 through 19 show flowcharts illustrating methods that support resource set configuration reporting with multiple channel and interference measurements in accordance with aspects of the present disclosure.

FIG. 14 shows a flowchart illustrating a method 1400 that supports resource set configuration reporting with multiple channel and interference measurements in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a reporting configuration message that configures the UE to generate a measurement report that indicates a first resource set including a first set of resources and a second resource set including a second set of resources that are different from the first set of resources. The operations of 1405 may be performed according to the methods described herein. In some examples, aspects of the operations of 1405 may be performed by a reporting configuration component as described with reference to FIGS. 6 through 9.

At 1410, the UE may perform a first set of measurements of the first set of resources of the first resource set and a second set of measurements of the second set of resources of the second resource set. The operations of 1410 may be performed according to the methods described herein. In some examples, aspects of the operations of 1410 may be performed by a measurement resource component as described with reference to FIGS. 6 through 9.

At 1415, the UE may transmit at least one measurement report indicating a first measurement of the first set of measurements corresponding to a first resource of the first set of resources of the first resource set, and a second measurement of the second set of measurements corresponding to a second resource of the second set of resources of the second resource set. The operations of 1415 may be performed according to the methods described herein. In some examples, aspects of the operations of 1415 may be performed by a measurement report transmitter as described with reference to FIGS. 6 through 9.

Figure 15:
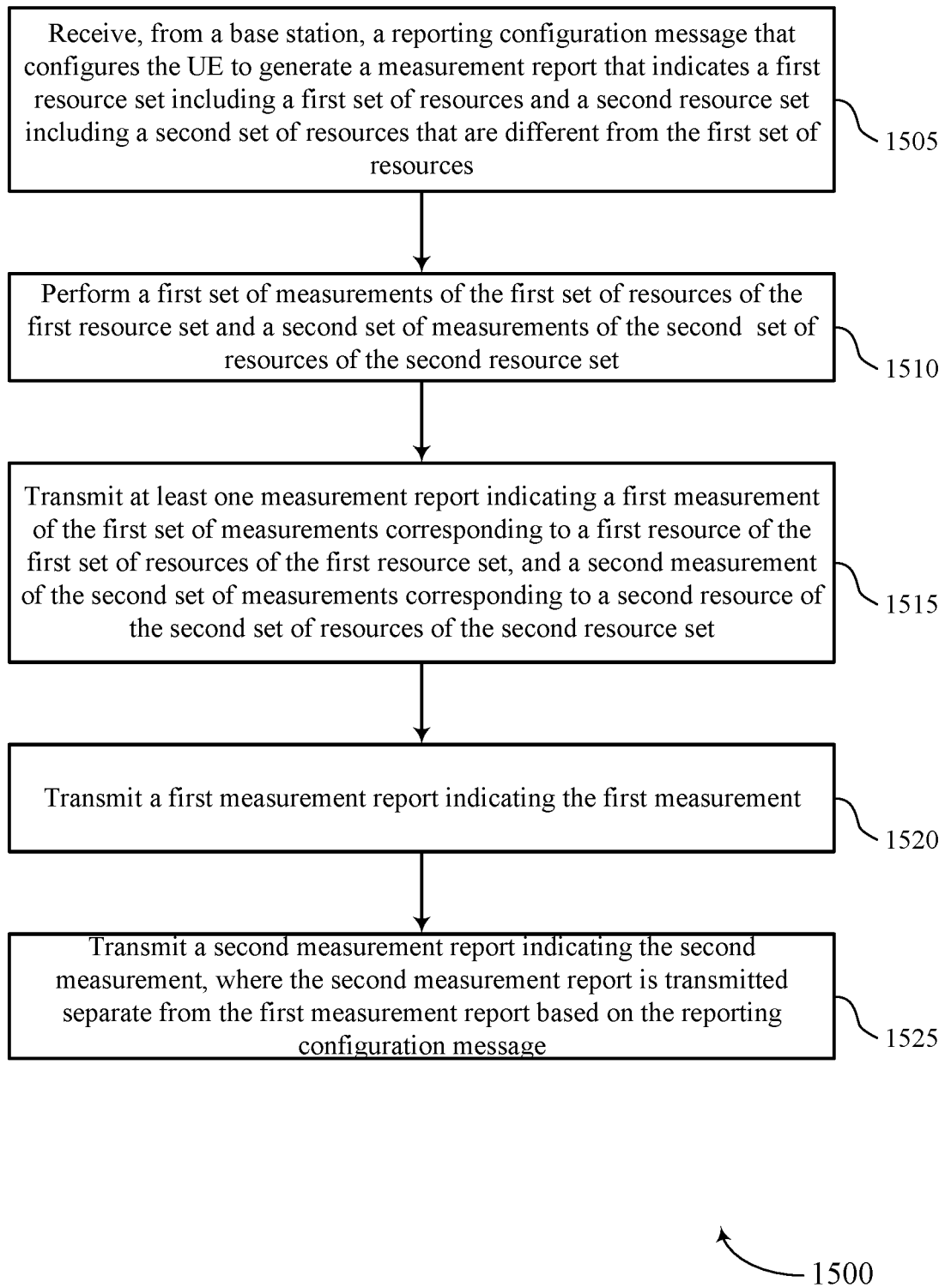

FIG. 15 shows a flowchart illustrating a method 1500 that supports resource set configuration reporting with multiple channel and interference measurements in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a reporting configuration message that configures the UE to generate a measurement report that indicates a first resource set including a first set of resources and a second resource set including a second set of resources that are different from the first set of resources. The operations of 1505 may be performed according to the methods described herein. In some examples, aspects of the operations of 1505 may be performed by a reporting configuration component as described with reference to FIGS. 6 through 9.

At 1510, the UE may perform a first set of measurements of the first set of resources of the first resource set and a second set of measurements of the second set of resources of the second resource set. The operations of 1510 may be performed according to the methods described herein. In some examples, aspects of the operations of 1510 may be performed by a measurement resource component as described with reference to FIGS. 6 through 9.

At 1515, the UE may transmit at least one measurement report indicating a first measurement of the first set of measurements corresponding to a first resource of the first set of resources of the first resource set, and a second measurement of the second set of measurements corresponding to a second resource of the second set of resources of the second resource set. The operations of 1515 may be performed according to the methods described herein. In some examples, aspects of the operations of 1515 may be performed by a measurement report transmitter as described with reference to FIGS. 6 through 9.

At 1520, the UE may transmit a first measurement report indicating the first measurement. The operations of 1520 may be performed according to the methods described herein. In some examples, aspects of the operations of 1520 may be performed by a measurement report transmitter as described with reference to FIGS. 6 through 9.

At 1525, the UE may transmit a second measurement report indicating the second measurement, where the second measurement report is transmitted separate from the first measurement report based on the reporting configuration message. The operations of 1525 may be performed according to the methods described herein. In some examples, aspects of the operations of 1525 may be performed by a measurement report transmitter as described with reference to FIGS. 6 through 9.

Figure 16:
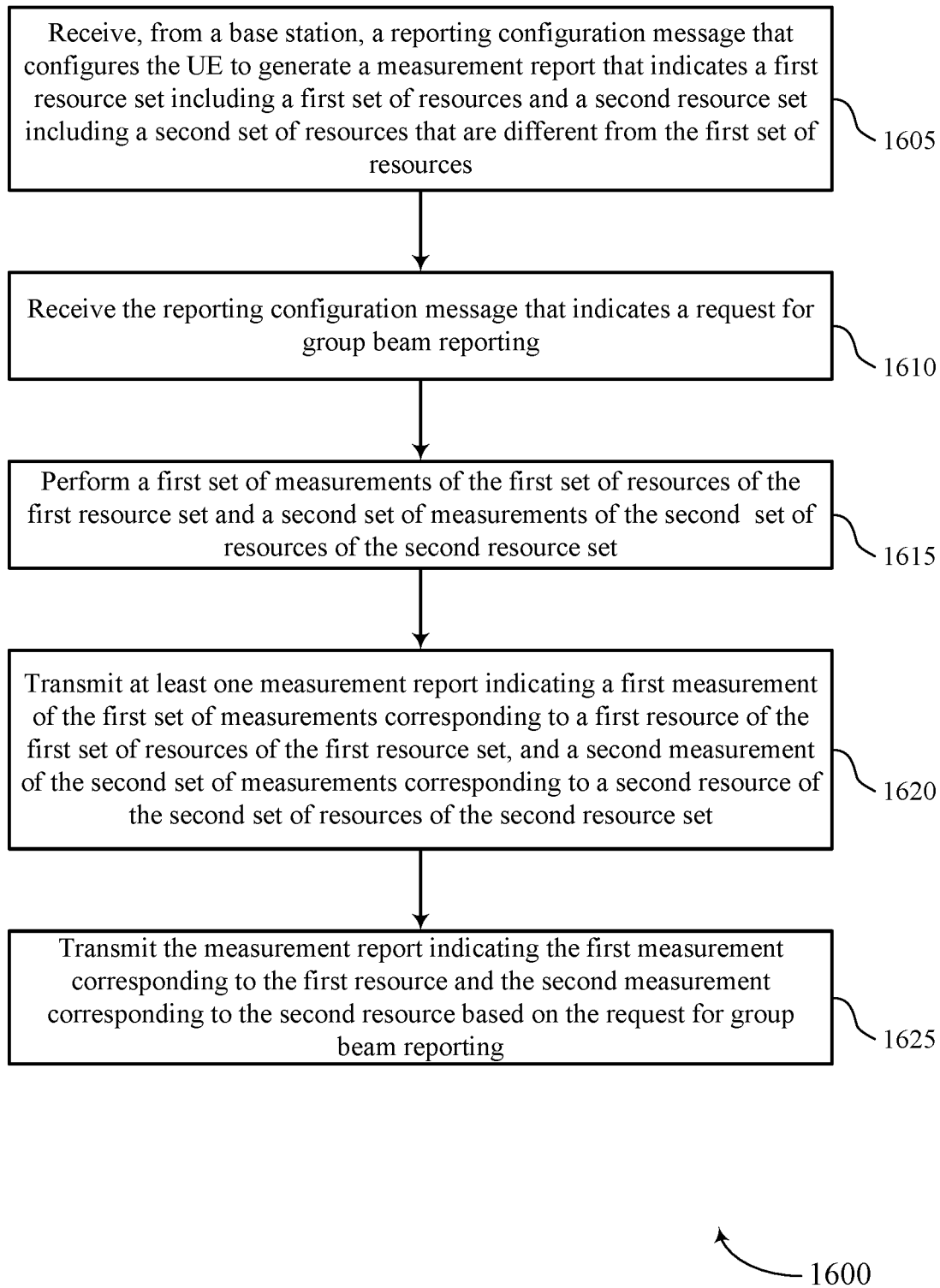

FIG. 16 shows a flowchart illustrating a method 1600 that supports resource set configuration reporting with multiple channel and interference measurements in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a reporting configuration message that configures the UE to generate a measurement report that indicates a first resource set including a first set of resources and a second resource set including a second set of resources that are different from the first set of resources. The operations of 1605 may be performed according to the methods described herein. In some examples, aspects of the operations of 1605 may be performed by a reporting configuration component as described with reference to FIGS. 6 through 9.

At 1610, the UE may receive the reporting configuration message that indicates a request for group beam reporting. The operations of 1610 may be performed according to the methods described herein. In some examples, aspects of the operations of 1610 may be performed by a reporting configuration component as described with reference to FIGS. 6 through 9.

At 1615, the UE may perform a first set of measurements of the first set of resources of the first resource set and a second set of measurements of the second set of resources of the second resource set. The operations of 1615 may be performed according to the methods described herein. In some examples, aspects of the operations of 1615 may be performed by a measurement resource component as described with reference to FIGS. 6 through 9.

At 1620, the UE may transmit at least one measurement report indicating a first measurement of the first set of measurements corresponding to a first resource of the first set of resources of the first resource set, and a second measurement of the second set of measurements corresponding to a second resource of the second set of resources of the second resource set. The operations of 1620 may be performed according to the methods described herein. In some examples, aspects of the operations of 1620 may be performed by a measurement report transmitter as described with reference to FIGS. 6 through 9.

At 1625, the UE may transmit at least one measurement report indicating the first measurement corresponding to the first resource and the second measurement corresponding to the second resource based on the request for group beam reporting. The operations of 1625 may be performed according to the methods described herein. In some examples, aspects of the operations of 1625 may be performed by a measurement report transmitter as described with reference to FIGS. 6 through 9.

Figure 17:
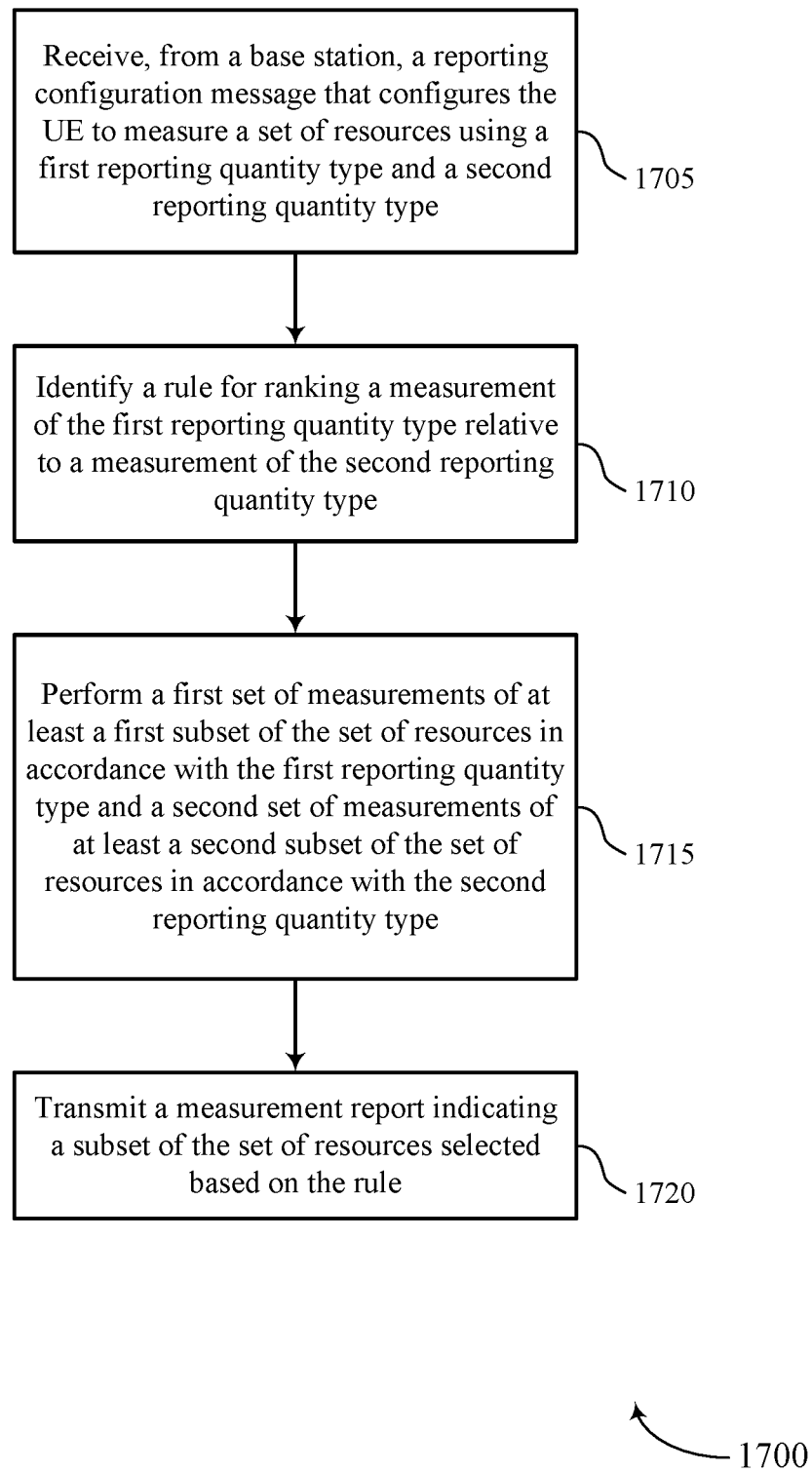

FIG. 17 shows a flowchart illustrating a method 1700 that supports resource set configuration reporting with multiple channel and interference measurements in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a reporting configuration message that configures the UE to measure a set of resources using a first reporting quantity type and a second reporting quantity type. The operations of 1705 may be performed according to the methods described herein. In some examples, aspects of the operations of 1705 may be performed by a reporting configuration component as described with reference to FIGS. 6 through 9.

At 1710, the UE may identify a rule for ranking a measurement of the first reporting quantity type relative to a measurement of the second reporting quantity type. The operations of 1710 may be performed according to the methods described herein. In some examples, aspects of the operations of 1710 may be performed by a reporting quantity priority component as described with reference to FIGS. 6 through 9.

At 1715, the UE may perform a first set of measurements of at least a first subset of the set of resources in accordance with the first reporting quantity type and a second set of measurements of at least a second subset of the set of resources in accordance with the second reporting quantity type. The operations of 1715 may be performed according to the methods described herein. In some examples, aspects of the operations of 1715 may be performed by a measurement resource component as described with reference to FIGS. 6 through 9.

At 1720, the UE may transmit a measurement report indicating a subset of the set of resources selected based on the rule. The operations of 1720 may be performed according to the methods described herein. In some examples, aspects of the operations of 1720 may be performed by a measurement report transmitter as described with reference to FIGS. 6 through 9.

Figure 18:
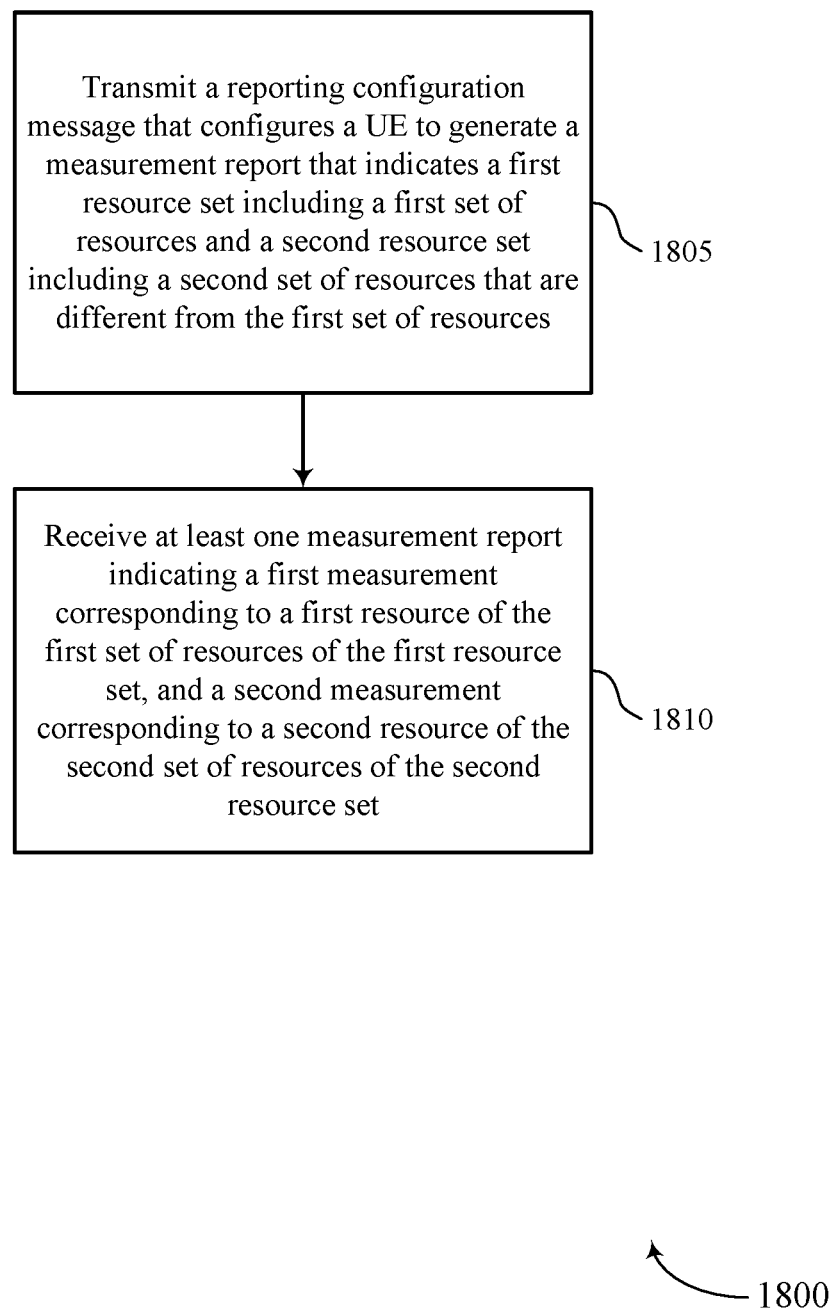

FIG. 18 shows a flowchart illustrating a method 1800 that supports resource set configuration reporting with multiple channel and interference measurements in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a reporting configuration message that configures a UE to generate a measurement report that indicates a first resource set including a first set of resources and a second resource set including a second set of resources that are different from the first set of resources. The operations of 1805 may be performed according to the methods described herein. In some examples, aspects of the operations of 1805 may be performed by a reporting configuration component as described with reference to FIGS. 10 through 13.

At 1810, the base station may receive the measurement report indicating a first measurement corresponding to a first resource of the first set of resources of the first resource set, and a second measurement corresponding to a second resource of the second set of resources of the second resource set. The operations of 1810 may be performed according to the methods described herein. In some examples, aspects of the operations of 1810 may be performed by a measurement report receiver as described with reference to FIGS. 10 through 13.

Figure 19:
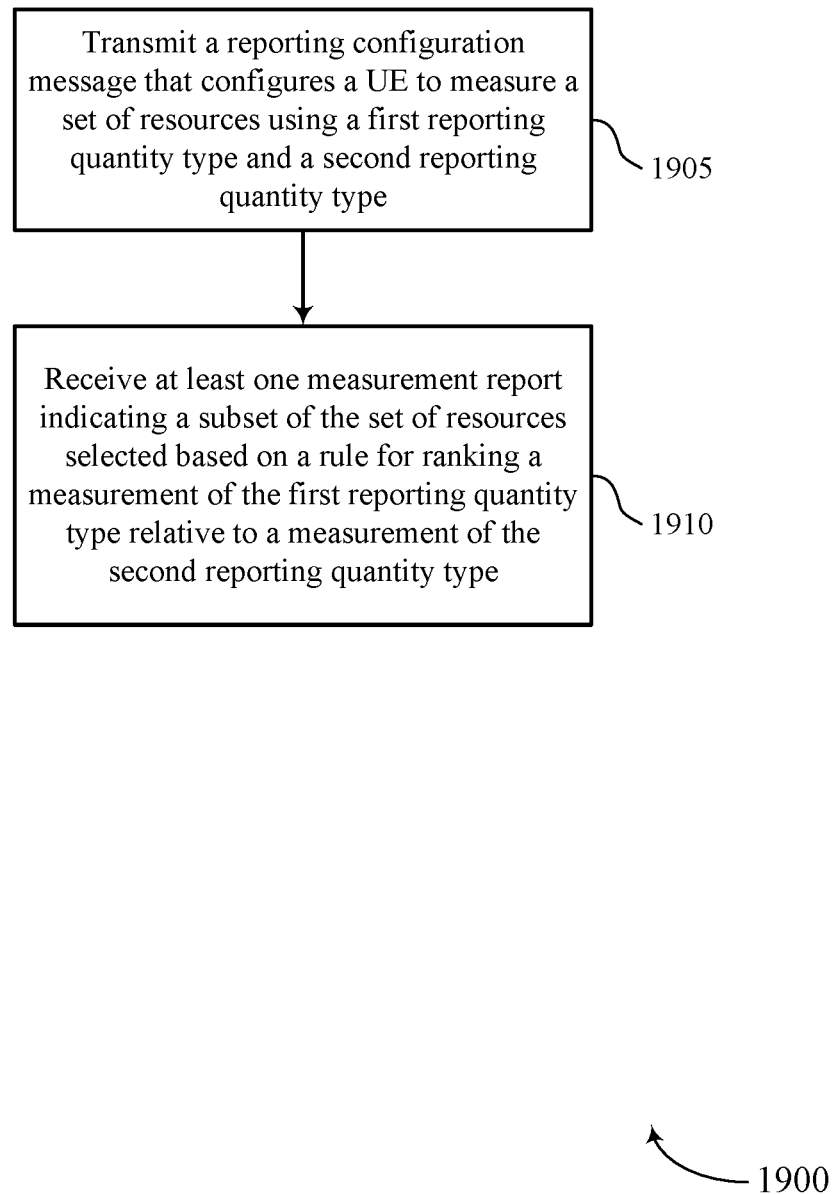

FIG. 19 shows a flowchart illustrating a method 1900 that supports resource set configuration reporting with multiple channel and interference measurements in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a reporting configuration message that configures a UE to measure a set of resources using a first reporting quantity type and a second reporting quantity type. The operations of 1905 may be performed according to the methods described herein. In some examples, aspects of the operations of 1905 may be performed by a reporting configuration component as described with reference to FIGS. 10 through 13.

At 1910, the base station may receive a measurement report indicating a subset of the set of resources selected based on a rule for ranking a measurement of the first reporting quantity type relative to a measurement of the second reporting quantity type. The operations of 1910 may be performed according to the methods described herein. In some examples, aspects of the operations of 1910 may be performed by a measurement report receiver as described with reference to FIGS. 10 through 13.

The following provides an overview of aspects of the present disclosure:

Aspect 1: A method for wireless communication at a UE, comprising: receiving, from a base station, a reporting configuration message that configures the UE to generate a measurement report that indicates a first resource set comprising a first plurality of resources and a second resource set comprising a second plurality of resources that are different from the first plurality of resources; performing a first plurality of measurements of the first plurality of resources of the first resource set and a second plurality of measurements of the second plurality of resources of the second resource set; and transmitting at least one measurement report indicating a first measurement of the first plurality of measurements corresponding to a first resource of the first plurality of resources of the first resource set, and a second measurement of the second plurality of measurements corresponding to a second resource of the second plurality of resources of the second resource set.

Aspect 2: The method of aspect 1, wherein transmitting the at least one measurement report comprises: transmitting a first measurement report indicating the first measurement; and transmitting a second measurement report indicating the second measurement, wherein the second measurement report is transmitted separate from the first measurement report based at least in part on the reporting configuration message.

Aspect 3: The method of any of aspects 1 through 2, wherein receiving the reporting configuration message comprises: receiving the reporting configuration message that indicates a first plurality of resource sets and a second plurality of resources sets, and a respective mapping between each resource set of the first plurality of resource sets and each resource set of the second plurality of resource sets.

Aspect 4: The method of aspect 3, wherein the first plurality of resource sets comprise a plurality of channel measurement resource sets and the second plurality of resource sets comprises a plurality of interference measurement resource sets.

Aspect 5: The method of any of aspects 1 through 4, wherein receiving the reporting configuration message further comprises: receiving the reporting configuration message that indicates a request for group beam reporting; and transmitting the at least one measurement report indicating the first measurement corresponding to the first resource and the second measurement corresponding to the second resource based at least in part on the request for group beam reporting.

Aspect 6: The method of any of aspects 1 through 5, wherein each measurement of the first plurality of measurements corresponds to a respective resource of the first resource set.

Aspect 7: The method of any of aspects 1 through 6, wherein each measurement of the second plurality of measurements corresponds to a respective resource from the second resource set.

Aspect 8: The method of any of aspects 1 through 7, wherein the first resource set is a first channel measurement resource set and the second resource set is a second channel measurement resource set, or the first resource set is a first interference measurement resource set and the second resource set is a second interference measurement resource set.

Aspect 9: The method of any of aspects 1 through 8, wherein the measurement report indicates a first resource identifier of the first resource, a second resource identifier of the second resource, or both.

Aspect 10: The method of any of aspects 1 through 9, wherein the first plurality of measurements and the second plurality of measurements comprise one or more SINR measurements, RSRP measurements, or both.

Aspect 11: A method for wireless communication at a UE, comprising: receiving, from a base station, a reporting configuration message that configures the UE to measure a plurality of resources using a first reporting quantity type and a second reporting quantity type; identifying a rule for ranking a measurement of the first reporting quantity type relative to a measurement of the second reporting quantity type; performing a first plurality of measurements of at least a first subset of the plurality of resources in accordance with the first reporting quantity type and a second plurality of measurements of at least a second subset of the plurality of resources in accordance with the second reporting quantity type; and transmitting a measurement report indicating a subset of the plurality of resources selected based at least in part on the rule.

Aspect 12: The method of aspect 11, wherein identifying the rule further comprises: receiving, from the base station, control signaling that comprises an indication of the rule, wherein the control signaling comprises an RRC message, a MAC-CE, DCI, or any combination thereof.

Aspect 13: The method of any of aspects 11 through 12, wherein identifying the rule comprises: receiving control signaling that indicates the rule that is a scaling factor to apply to one or more measurements of the first reporting quantity type, or to one or more measurements of the second reporting quantity type, or both, wherein the measurement report indicates the subset of the plurality of resources selected based at least in part on the scaling factor.

Aspect 14: The method of aspect 13, wherein the first reporting quantity type is an RSRP measurement, and the second reporting quantity type is an SINR measurement.

Aspect 15: The method of any of aspects 11 through 14, wherein receiving the reporting configuration message comprises: receiving the reporting configuration message where an order in which the first reporting quantity type and the second reporting quantity type occur within the reporting configuration message indicates the rule.

Aspect 16: The method of any of aspects 11 through 15, wherein identifying the rule further comprises: retrieving the rule from a memory of the UE.

Aspect 17: A method for wireless communication at a base station, comprising: transmitting a reporting configuration message that configures a UE to generate a measurement report that indicates a first resource set comprising a first plurality of resources and a second resource set comprising a second plurality of resources that are different from the first plurality of resources; and receiving the measurement report indicating a first measurement corresponding to a first resource of the first plurality of resources of the first resource set, and a second measurement corresponding to a second resource of the second plurality of resources of the second resource set.

Aspect 18: The method of aspect 17, wherein receiving the measurement report comprises: receiving a first measurement report indicating the first measurement; and receiving a second measurement report indicating the second measurement, wherein the second measurement report is transmitted separate from the first measurement report based at least in part on the reporting configuration message.

Aspect 19: The method of any of aspects 17 through 18, wherein transmitting the reporting configuration message comprises: transmitting the reporting configuration message that indicates a first plurality of resource sets and a second plurality of resources sets, and a respective mapping between each resource set of the first plurality of resource sets and each resource set of the second plurality of resource sets.

Aspect 20: The method of any of aspects 17 through 19, wherein transmitting the reporting configuration message further comprises: transmitting the reporting configuration message that indicates a request for group beam reporting at the UE; and receiving the measurement report indicating the first measurement corresponding to the first resource and the second measurement corresponding to the second resource based at least in part on the request for group beam reporting.

Aspect 21: The method of any of aspects 17 through 20, wherein each measurement of a first plurality of measurements corresponds to a respective resource of the first resource set.

Aspect 22: The method of any of aspects 17 through 21, wherein each measurement of a second plurality of measurements corresponds to a respective resource from the second resource set.

Aspect 23: The method of any of aspects 17 through 22, wherein the first resource set is a first channel measurement resource set and the second resource set is a second channel measurement resource set, or the first resource set is a first interference measurement resource set and the second resource set is a second interference measurement resource set.

Aspect 24: The method of any of aspects 17 through 23, wherein the measurement report indicates a first resource identifier of the first resource, a second resource identifier of the second resource, or both.

Aspect 25: The method of any of aspects 17 through 24, wherein the first measurement and the second measurement comprise one or more of an SINR measurement or an RSRP measurement.

Aspect 26: The method of claim 0 wherein the first plurality of resource sets comprise a plurality of channel measurement resource sets and the second plurality of resource sets comprise a plurality of interference measurement resource sets.

Aspect 27: A method for wireless communication at a base station, comprising: transmitting a reporting configuration message that configures a UE to measure a plurality of resources using a first reporting quantity type and a second reporting quantity type; and receiving a measurement report indicating a subset of the plurality of resources selected based at least in part on a rule for ranking a measurement of the first reporting quantity type relative to a measurement of the second reporting quantity type.

Aspect 28: The method of aspect 27, further comprising: transmitting, to the UE, control signaling that comprises an indication of the rule, wherein the control signaling comprises an RRC message, a MAC-CE, DCI, or any combination thereof.

Aspect 29: The method of any of aspects 27 through 28, further comprising: transmitting control signaling that indicates the rule that is a scaling factor to apply to one or more measurements of the first reporting quantity type, or to one or more measurements of the second reporting quantity type, or both, wherein the measurement report indicates the subset of the plurality of resources selected based at least in part on the scaling factor, and wherein the first reporting quantity type is a reference signal receive power (RSRP) measurement, and the second reporting quantity type is a signal to interference plus noise ratio (SINR) measurement.

Aspect 30: The method of any of aspects 27 through 29, wherein transmitting the reporting configuration message comprises: transmitting the reporting configuration message where an order in which the first reporting quantity type and the second reporting quantity type occur within the reporting configuration message indicates the rule.

Aspect 31: An apparatus for wireless communication at a UE, comprising a processor; memory coupled with the processor; and instructions stored in the memory and executable by the processor to cause the apparatus to perform a method of any of aspects 1 through 10.

Aspect 32: An apparatus for wireless communication at a UE, comprising at least one means for performing a method of any of aspects 1 through 10.

Aspect 33: A non-transitory computer-readable medium storing code for wireless communication at a UE, the code comprising instructions executable by a processor to perform a method of any of aspects 1 through 10.

Aspect 34: An apparatus for wireless communication at a UE, comprising a processor; memory coupled with the processor; and instructions stored in the memory and executable by the processor to cause the apparatus to perform a method of any of aspects 11 through 16.

Aspect 35: An apparatus for wireless communication at a UE, comprising at least one means for performing a method of any of aspects 11 through 16.

Aspect 36: A non-transitory computer-readable medium storing code for wireless communication at a UE, the code comprising instructions executable by a processor to perform a method of any of aspects 11 through 16.

Aspect 37: An apparatus for wireless communication at a base station, comprising a processor; memory coupled with the processor; and instructions stored in the memory and executable by the processor to cause the apparatus to perform a method of any of aspects 17 through 25.

Aspect 38: An apparatus for wireless communication at a base station, comprising at least one means for performing a method of any of aspects 17 through 25.

Aspect 39: A non-transitory computer-readable medium storing code for wireless communication at a base station, the code comprising instructions executable by a processor to perform a method of any of aspects 17 through 25.

Aspect 40: An apparatus comprising a processor; memory coupled with the processor; and instructions stored in the memory and executable by the processor to cause the apparatus to perform a method of any of aspects 26 through 26.

Aspect 41: An apparatus comprising at least one means for performing a method of any of aspects 26 through 26.

Aspect 42: A non-transitory computer-readable medium storing code the code comprising instructions executable by a processor to perform a method of any of aspects 26 through 26.

Aspect 43: An apparatus for wireless communication at a base station, comprising a processor; memory coupled with the processor; and instructions stored in the memory and executable by the processor to cause the apparatus to perform a method of any of aspects 27 through 30.

Aspect 44: An apparatus for wireless communication at a base station, comprising at least one means for performing a method of any of aspects 27 through 30.

Aspect 45: A non-transitory computer-readable medium storing code for wireless communication at a base station, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a reporting configuration message that configures the UE to generate a measurement report that indicates a first resource set comprising a first plurality of resources and a second resource set comprising a second plurality of resources that are different from the first plurality of resources;
   performing a first plurality of measurements of the first plurality of resources of the first resource set and a second plurality of measurements of the second plurality of resources of the second resource set; and
   transmitting a single measurement report indicating a first measurement of the first plurality of measurements corresponding to a first resource of the first plurality of resources of the first resource set, and a second measurement of the second plurality of measurements corresponding to a second resource of the second plurality of resources of the second resource set.

2. The method of claim 1, further comprising:
   receiving a second reporting configuration message;
   transmitting a first additional measurement report indicating a first additional measurement based at least in part on the second reporting configuration message; and
   transmitting a second additional measurement report indicating a second additional measurement based at least in part on the second reporting configuration message, wherein the second additional measurement report is transmitted separate from the first additional measurement report based at least in part on the second reporting configuration message.

3. The method of claim 1, wherein receiving the reporting configuration message comprises:
   receiving the reporting configuration message that indicates a first plurality of resource sets and a second plurality of resource sets, and a respective mapping between each resource set of the first plurality of resource sets and each resource set of the second plurality of resource sets.

4. The method of claim 3, wherein the first plurality of resource sets comprise a plurality of channel measurement resource sets and the second plurality of resource sets comprises a plurality of interference measurement resource sets.

5. The method of claim 1, wherein receiving the reporting configuration message further comprises:
   receiving the reporting configuration message that indicates a request for group beam reporting; and
   transmitting the single measurement report indicating the first measurement corresponding to the first resource and the second measurement corresponding to the second resource based at least in part on the request for group beam reporting.

6. The method of claim 1, wherein each measurement of the first plurality of measurements corresponds to a respective resource of the first resource set.

7. The method of claim 1, wherein each measurement of the second plurality of measurements corresponds to a respective resource from the second resource set.

8. The method of claim 1, wherein the first resource set is a first channel measurement resource set and the second resource set is a second channel measurement resource set, or the first resource set is a first interference measurement resource set and the second resource set is a second interference measurement resource set.

9. The method of claim 1, wherein the measurement report indicates a first resource identifier of the first resource, a second resource identifier of the second resource, or both.

10. The method of claim 1, wherein the first plurality of measurements and the second plurality of measurements comprise one or more signal to interference plus noise ratio (SINR) measurements, reference signal receive power (RSRP) measurements, or both.

11. A method for wireless communication, comprising:
  transmitting a reporting configuration message that configures a user equipment (UE) to generate a measurement report and that indicates a first resource set comprising a first plurality of resources and a second resource set comprising a second plurality of resources that are different from the first plurality of resources; and
  receiving a single measurement report indicating a first measurement corresponding to a first resource of the first plurality of resources of the first resource set, and a second measurement corresponding to a second resource of the second plurality of resources of the second resource set.

12. The method of claim 11, further comprising:
  receive a second reporting configuration message;
  receiving a first additional measurement report indicating a first additional measurement based at least in part on the second reporting configuration message; and
  receiving a second additional measurement report indicating a second additional measurement based at least in part on the second reporting configuration message,
  wherein the second additional measurement report is transmitted separate from the first additional measurement report based at least in part on the second reporting configuration message.

13. The method of claim 11, wherein transmitting the reporting configuration message comprises:
  transmitting the reporting configuration message that indicates a first plurality of resource sets and a second plurality of resource sets, and a respective mapping between each resource set of the first plurality of resource sets and each resource set of the second plurality of resource sets.

14. The method of claim 13, wherein the first plurality of resource sets comprise a plurality of channel measurement resource sets and the second plurality of resource sets comprise a plurality of interference measurement resource sets.

15. The method of claim 11, wherein transmitting the reporting configuration message further comprises:
  transmitting the reporting configuration message that indicates a request for group beam reporting at the UE; and
  receiving the single measurement report indicating the first measurement corresponding to the first resource and the second measurement corresponding to the second resource based at least in part on the request for group beam reporting.

16. The method of claim 11, wherein each measurement of a first plurality of measurements corresponds to a respective resource of the first resource set.

17. The method of claim 11, wherein each measurement of a second plurality of measurements corresponds to a respective resource from the second resource set.

18. The method of claim 11, wherein the first resource set is a first channel measurement resource set and the second resource set is a second channel measurement resource set, or the first resource set is a first interference measurement resource set and the second resource set is a second interference measurement resource set.

19. The method of claim 11, wherein the single measurement report indicates a first resource identifier of the first resource, a second resource identifier of the second resource, or both.

20. The method of claim 11, wherein the first measurement and the second measurement comprise one or more of a signal to interference plus noise ratio (SINR) measurement or a reference signal receive power (RSRP) measurement.

21. A user equipment (UE) for wireless communication, comprising:
  one or more memories storing processor-executable code; and
  one or more processors coupled with the one or more memories and individually or collectively operable to execute the code to cause the UE to:
    receive a reporting configuration message that configures the UE to generate a measurement report that indicates a first resource set comprising a first plurality of resources and a second resource set comprising a second plurality of resources that are different from the first plurality of resources;
    perform a first plurality of measurements of the first plurality of resources of the first resource set and a second plurality of measurements of the second plurality of resources of the second resource set; and
    transmit a single measurement report indicating a first measurement of the first plurality of measurements corresponding to a first resource of the first plurality of resources of the first resource set, and a second measurement of the second plurality of measurements corresponding to a second resource of the second plurality of resources of the second resource set.

22. The UE of claim 21, wherein the one or more processors are individually or collectively further operable to execute the code to cause the UE to:
  receive a second reporting configuration message;
  transmit a first additional measurement report indicating a first additional measurement based at least in part on the second reporting configuration message; and
  transmit a second additional measurement report indicating a second additional measurement based at least in part on the second reporting configuration message,
  wherein the second additional measurement report is transmitted separate from the first additional measurement report based at least in part on the second reporting configuration message.

23. The UE of claim 21, wherein, to receive the reporting configuration message, the one or more processors are individually or collectively operable to execute the code to cause the UE to:
  receive the reporting configuration message that indicates a first plurality of resource sets and a second plurality of resource sets, and a respective mapping between each resource set of the first plurality of resource sets and each resource set of the second plurality of resource sets.

24. The UE of claim 23, wherein the first plurality of resource sets comprise a plurality of channel measurement resource sets and the second plurality of resource sets comprises a plurality of interference measurement resource sets.

25. The UE of claim 21, wherein, to receive the reporting configuration message, the one or more processors are individually or collectively operable to execute the code to cause the UE to:
receive the reporting configuration message that indicates a request for group beam reporting; and
transmit the single measurement report indicating the first measurement corresponding to the first resource and the second measurement corresponding to the second resource based at least in part on the request for group beam reporting.

26. The UE of claim 21, wherein each measurement of the first plurality of measurements corresponds to a respective resource of the first resource set.

27. The UE of claim 21, wherein each measurement of the second plurality of measurements corresponds to a respective resource from the second resource set.

28. The UE of claim 21, wherein the first resource set is a first channel measurement resource set and the second resource set is a second channel measurement resource set, or the first resource set is a first interference measurement resource set and the second resource set is a second interference measurement resource set.

29. The UE of claim 21, wherein the measurement report indicates a first resource identifier of the first resource, a second resource identifier of the second resource, or both.

30. An apparatus for wireless communication, comprising:
one or more memories storing processor-executable code; and
one or more processors coupled with the one or more memories and individually or collectively operable to execute the code to cause the apparatus to:
transmit a reporting configuration message that configures a user equipment (UE) to generate a measurement report and that indicates a first resource set comprising a first plurality of resources and a second resource set comprising a second plurality of resources that are different from the first plurality of resources; and
receive a single measurement report indicating a first measurement corresponding to a first resource of the first plurality of resources of the first resource set, and a second measurement corresponding to a second resource of the second plurality of resources of the second resource set.

* * * * *